(12) United States Patent
Li et al.

(10) Patent No.: US 11,503,467 B2
(45) Date of Patent: Nov. 15, 2022

(54) AUTHENTICATION METHOD, DEVICE, AND SYSTEM

(71) Applicant: HUAWEI TECHNOLOGIES CO., LTD., Guangdong (CN)

(72) Inventors: Hua Li, Xi'an (CN); Chengdong He, Shenzhen (CN); Bo Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 113 days.

(21) Appl. No.: 17/185,467

(22) Filed: Feb. 25, 2021

(65) Prior Publication Data

US 2021/0185527 A1    Jun. 17, 2021

Related U.S. Application Data

(63) Continuation of application No. PCT/CN2019/101941, filed on Aug. 22, 2019.

(30) Foreign Application Priority Data

Sep. 18, 2018 (CN) .......................... 201811090292.7

(51) Int. Cl.
*H04W 12/06* (2021.01)
*H04W 8/02* (2009.01)
(Continued)

(52) U.S. Cl.
CPC ......... *H04W 12/06* (2013.01); *H04L 12/2856* (2013.01); *H04W 8/02* (2013.01); *H04W 12/63* (2021.01)

(58) Field of Classification Search
CPC ....... H04W 12/06; H04W 12/63; H04W 8/02; H04L 12/2856; H04L 63/08
See application file for complete search history.

(56) References Cited

U.S. PATENT DOCUMENTS 10,367,658 B2 *  7/2019  Li ........................ H04W 76/10
10,868,795 B2 * 12/2020  Bichot .................. H04L 45/745
(Continued)

FOREIGN PATENT DOCUMENTS

CN       1859248 A     11/2006
CN     101051899 A     10/2007
(Continued)

OTHER PUBLICATIONS

Extended European Search Report issued in European Application No. 19863275.4 dated Jun. 14, 2021, 8 pages.
(Continued)

*Primary Examiner* — Khawar Iqbal
(74) *Attorney, Agent, or Firm* — Fish & Richardson P.C.

(57) ABSTRACT

Example authentication methods, devices, and systems are provided, where those example can be used to verify validity of access location information of a next generation-residential gateway (NG-RG) in a fixed-mobile convergence architecture. One example method includes a network device receiving first link information that is used to represent an access location of a residential gateway, and the network device obtaining second link information of the residential gateway. When the first link information matches partial or all information of the second link information, or when the first link information matches partial or all information of one link information of the second link information, the network device verifies validity of the access location of the residential gateway.

6 Claims, 11 Drawing Sheets

(51) Int. Cl.
*H04W 12/63* (2021.01)
*H04L 12/28* (2006.01)

(56) References Cited

U.S. PATENT DOCUMENTS

| | | | |
|---|---|---|---|
| 2010/0103843 | A1 | 4/2010 | Carrillo et al. |
| 2017/0288972 | A1* | 10/2017 | Li .................... H04L 41/20 |
| 2019/0289672 | A1* | 9/2019 | Ben Henda ......... H04W 12/041 |
| 2020/0037165 | A1* | 1/2020 | Kunz ................. H04W 12/106 |
| 2020/0296107 | A1* | 9/2020 | Malik ................. H04L 63/107 |
| 2020/0314024 | A1* | 10/2020 | Peng ................. H04L 63/0892 |
| 2020/0351351 | A1* | 11/2020 | Hu .................... H04L 67/12 |
| 2021/0345336 | A1* | 11/2021 | Mildh ................ H04W 72/10 |
| 2021/0400485 | A1* | 12/2021 | Ergen ................ G06F 16/9537 |
| 2022/0060350 | A1* | 2/2022 | Dimitrovski ........ H04L 12/2834 |
| 2022/0182742 | A1* | 6/2022 | Bali ................. H04W 72/0453 |

FOREIGN PATENT DOCUMENTS

| | | |
|---|---|---|
| CN | 101686164 A | 3/2010 |
| CN | 102143136 A | 8/2011 |
| CN | 103095536 A | 5/2013 |
| CN | 103582159 A | 2/2014 |
| WO | 2009155818 A1 | 12/2009 |
| WO | 2017206088 A1 | 12/2017 |
| WO | 2018158729 A1 | 9/2018 |

OTHER PUBLICATIONS

Intel, "Solution of 5GC Capable UE behind 5G-RG connected to 5GC via NG-RAN/W-5GAN", SA WG2 Meeting #S2-128, S2-186846, Newport Beach, California, USA, May 28-Jun. 1, 2018, 7 pages.

Motorola Mobility et al., "Update of Solution #11: Support 5GC-capable UEs via 5G-RG/FN-RG for wireline access network using N3GPP solutions," SA WG2 Meeting #128, S2-186437, Vilnius, Lithuania, Jul. 2-6, 2018, 8 pages.

Office Action issued in Chinese Application No. 201811090292.7 dated Mar. 1, 2021, 11 pages (with English translation).

3GPP TS 33.501 V15.1.0 (Jun. 2018), "3rd Generation Partnership Project; Technical Specification Group Services and System Aspects; Security architecture and procedures for 5G system (Release 15)," Jun. 2018, 152 pages.

Office Action issued in Chinese Application No. 201811090292.7 dated Aug. 20, 2020, 6 pages.

PCT International Search Report and Written Opinion issued in International Application No. PCT/CN2019/101941 dated Nov. 21, 2019, 8 pages (with partial English translation).

Peng, "SD-420 R2 SG Fixed Mobile Convergence Study," Broadband Forum Study Document, Revision 2, contrib-20838. Aug. 2018, 107 pages.

\* cited by examiner

AUTHENTICATION METHOD, DEVICE, AND SYSTEM

CROSS-REFERENCE TO RELATED APPLICATIONS

This application is a continuation of International Application No. PCT/CN2019/101941, filed on Aug. 22, 2019, which claims priority to Chinese Patent Application No. 201811090292.7, filed on Sep. 18, 2018. The disclosures of the aforementioned applications are hereby incorporated by reference in their entireties.

TECHNICAL FIELD

This application relates to the field of communications technologies, and in particular, to an authentication method, a device, and a system.

BACKGROUND

In a fixed-mobile convergence (namely, convergence of a fixed network and a mobile network) network architecture jointly defined by the $3^{rd}$ generation partnership project (3GPP) and the fixed network forum, a next generation-residential gateway (NG-RG) as a residential gateway can access a $5^{th}$ generation (5G) mobile core network by using a wireline 5G access network (W-5GAN) device and a 5G access gateway function (5G-AGF) network element. In a process of accessing the 5G mobile core network by the NG-RG, the NG-RG verifies validity of a universal subscriber identity module (USIM) by using a 5G-authentication and key agreement (5G-AKA) authentication algorithm or an extensible authentication protocol (EAP) authentication algorithm (for example, an EAP-AKA authentication algorithm or an improved EAP-AKA (EAP-AKA') authentication algorithm). In addition, considering that an access location of an NG-RG in a fixed network generally needs to be fixed, currently, validity of access location information of the NG-RG needs to be verified while validity of a USIM is verified.

However, currently, there is no related solution for how to verify validity of access location information of an NG-RG in the foregoing fixed-mobile convergence architecture.

SUMMARY

Embodiments of this application provide an authentication method, a device, and a system, to be at least used to verify validity of access location information of an NG-RG in a fixed-mobile convergence architecture.

To achieve the foregoing objective, the following technical solutions are used in the embodiments of this application.

According to a first aspect, an authentication method is provided. The method includes: A network device receives first link information, where the first link information is used to represent an access location of a residential gateway; the network device obtains subscription information of the residential gateway, where the subscription information of the residential gateway includes second link information of the residential gateway, and the second link information is used to represent a location of the residential gateway; and the network device verifies validity of the access location of the residential gateway based on the first link information and the second link information. In the authentication method provided in the embodiment of this application, the network device may obtain the first link information that represents the access location of the home network element and the second link information of the residential gateway, and may verify the validity of the access location of the residential gateway based on the first link information and the second link information. Therefore, according to the authentication method provided in the embodiment of this application, the validity of the access location of the residential gateway can be verified in a fixed-mobile convergence architecture.

In a possible design, there are a plurality of pieces of second link information. That the network device verifies validity of the access location of the residential gateway based on the first link information and the second link information includes: If the first link information matches any one of the plurality of pieces of second link information, the network device determines that the access location of the residential gateway is valid. Optionally, in the embodiment of this application, link information matching means all or partial link information matching. For example, that the first link information matches any one of the plurality of pieces of second link information means that the first link information matches partial or all information of any one of the plurality of pieces of second link information. This is not specifically limited in the embodiment of this application.

In a possible design, the subscription information of the residential gateway further includes second virtual interface information of the residential gateway, where the second virtual interface information is used to represent a service type of the residential gateway. The method further includes: The network device receives first virtual interface information, where the first virtual interface information is used to represent a current service type of the residential gateway; and the network device verifies validity of a current service of the residential gateway based on the first virtual interface information and the second virtual interface information. In the authentication method provided in the embodiment of this application, the network device may obtain the first virtual interface information that represents the current service type of the home network element and the second virtual interface information of the residential gateway, and may verify the validity of the current service of the residential gateway based on the first virtual interface information and the second virtual interface information. Therefore, according to the authentication method provided in the embodiment of this application, the validity of the current service of the residential gateway can be verified in a fixed-mobile convergence architecture.

In a possible design, there are a plurality of pieces of second virtual interface information. That the network device verifies validity of a current service of the residential gateway based on the first virtual interface information and the second virtual interface information includes: If the first virtual interface information matches any one of the plurality of pieces of second virtual interface information, the network device determines that the current service of the residential gateway is valid. Optionally, in the embodiment of this application, virtual interface matching means all or partial virtual interface information matching. For example, that the first virtual interface information matches any one of the plurality of pieces of second virtual interface information means that the first virtual interface information matches partial or all information of any one of the plurality of pieces of second virtual interface information. This is not specifically limited in the embodiment of this application.

In a possible design, the network device is a mobility management network element. The method further includes: The mobility management network element sends a non-access stratum security mode command (NAS SMC) request message to the residential gateway, where the NAS SMC request message includes the first virtual interface information, and the first virtual interface information is used by the residential gateway to verify whether the first virtual interface information is modified on an air interface. Because the NAS SMC request message has integrity protection, information in the NAS SMC request message can be prevented from being tampered with. Therefore, according to this solution, whether the first virtual interface information is modified on the air interface can be verified.

In a possible design, the network device is a unified data management network element. Before the network device receives the first link information, the method further includes: The network device receives third link information, where the third link information is used to identify an access location of a residential gateway; and the network device stores the third link information into subscription information of the residential gateway according to a local policy. Because this solution provides an automatic binding manner of link information, subscription of access location information of the residential gateway can be simplified.

In a possible design, the network device is a unified data management network element. Before the network device receives the first virtual interface information from the residential gateway, the method further includes: The network device receives third virtual interface information from the residential gateway, where the third virtual interface information is used to identify a current service type of the residential gateway; and the network device stores the third virtual interface information into the subscription information of the residential gateway according to a local policy. Because this solution provides an automatic binding manner of virtual interface information, subscription of a service type of the residential gateway can be simplified.

According to a second aspect, an authentication method is provided. The method includes: A mobility management network element obtains a first key, where the first key is a temporary key between the mobility management network element and a residential gateway; the mobility management network element determines a second key based on the first key, an identifier of a non-$3^{rd}$ generation partnership project (3GPP) network, and a classification identifier of the non-3GPP network; and the mobility management network element sends the second key to the access gateway function network element. In the embodiment of this application, when deriving the second key, the mobility management network element considers the identifier of the non-3GPP network and the classification identifier of the non-3GPP network. Therefore, different types of access manners in the non-3GPP network can be isolated.

In a possible design, that the mobility management network element determines a second key based on the first key, an identifier of a non-3GPP network, and a classification identifier of the non-3GPP network includes: the mobility management network element determines the second key based on the first key, the identifier of the non-3GPP network, the classification identifier of the non-3GPP network, and a non-access stratum NAS message count value.

In a possible design, the classification identifier of the non-3GPP network is used to indicate that an access manner of the residential gateway is fixed network access or Wi-Fi access. Certainly, the classification identifier of the non-3GPP network may be used to indicate another non-3GPP access type. This is not specifically limited in the embodiment of this application.

In a possible design, the NAS message count value is an uplink NAS message count value or a downlink NAS message count value.

According to a third aspect, an authentication method is provided. The method includes: A residential gateway obtains a first key, where the first key is a temporary key between the residential gateway and a mobility management network element; and the residential gateway determines a second key based on the first key, an identifier of a non-$3^{rd}$ generation partnership project (3GPP) network, and a classification identifier of the non-3GPP network. In the embodiment of this application, when deriving the second key, the residential gateway considers the identifier of the non-3GPP network and the classification identifier of the non-3GPP network. Therefore, different types of access manners in the non-3GPP network can be isolated.

In a possible design, that the residential gateway determines a second key based on the first key, an identifier of a non-3GPP network, and a classification identifier of the non-3GPP network includes: the residential gateway determines the second key based on the first key, the identifier of the non-3GPP network, the classification identifier of the non-3GPP network, and a non-access stratum NAS message count value.

In a possible design, the classification identifier of the non-3GPP network is used to indicate that an access manner of the residential gateway is fixed network access or Wi-Fi access. Alternatively, the classification identifier of the non-3GPP network may be used to indicate another non-3GPP access type. This is not specifically limited in the embodiment of this application.

In a possible design, the NAS message count value is an uplink NAS message count value or a downlink NAS message count value.

According to a fourth aspect, a network device is provided. The network device has a function of implementing the method according to the first aspect. The function may be implemented by hardware or may be implemented by hardware by executing corresponding software. The hardware or the software includes one or more modules corresponding to the foregoing function.

According to a fifth aspect, a network device is provided, and includes a processor and a memory. The memory is configured to store a computer-executable instruction. When the network device runs, the processor executes the computer-executable instruction stored in the memory, to enable the network device to perform the authentication method according to any design in the first aspect.

According to a sixth aspect, a network device is provided, and includes a processor. The processor is configured to be coupled to a memory and read an instruction in the memory, to perform the authentication method according to any design in the first aspect based on the instruction.

According to a seventh aspect, a computer-readable storage medium is provided. The computer-readable storage medium stores an instruction. When the instruction is run on a computer, the computer is enabled to perform the authentication method according to any design in the first aspect.

According to an eighth aspect, a computer program product including an instruction is provided. When the computer program product is run on a computer, the computer is enabled to perform the authentication method according to any design in the first aspect.

According to a ninth aspect, an apparatus (for example, the apparatus may be a chip system) is provided. The apparatus includes a processor configured to support a network device to implement a function related to the first aspect, for example, verifying validity of an access location of the residential gateway based on the first link information and the second link information. In a possible design, the apparatus further includes a memory. The memory is configured to store a program instruction and data that are required by the network device. When the apparatus is a chip system, the apparatus may include a chip, or may include a chip and another discrete device.

For technical effects brought by any design manner in the fourth aspect to the ninth aspect, refer to technical effects brought by different design manners in the first aspect. Details are not described herein again.

According to a tenth aspect, a mobility management network element is provided. The mobility management network element has a function of implementing the method according to the second aspect. The function may be implemented by hardware or may be implemented by hardware by executing corresponding software. The hardware or the software includes one or more modules corresponding to the foregoing function.

According to an eleventh aspect, a mobility management network element is provided, and includes a processor and a memory. The memory is configured to store a computer-executable instruction. When the mobility management network element runs, the processor executes the computer-executable instruction stored in the memory, to enable the mobility management network element to perform the authentication method according to any design in the second aspect.

According to a twelfth aspect, a mobility management network element is provided, and includes a processor. The processor is configured to be coupled to a memory and read an instruction in the memory, to perform the authentication method according to any design in the second aspect based on the instruction.

According to a thirteenth aspect, a computer-readable storage medium is provided. The computer-readable storage medium stores an instruction. When the instruction is run on a computer, the computer is enabled to perform the authentication method according to any design in the second aspect.

According to a fourteenth aspect, a computer program product including an instruction is provided. When the computer program product is run on a computer, the computer is enabled to perform the authentication method according to any design in the second aspect.

According to a fifteenth aspect, an apparatus (for example, the apparatus may be a chip system) is provided. The apparatus includes a processor configured to support a mobility management network element to implement a function related to the second aspect, for example, verifying validity of an access location of the residential gateway based on the first link information and the second link information. In a possible design, the apparatus further includes a memory. The memory is configured to store a program instruction and data that are required by the mobility management network element. When the apparatus is a chip system, the apparatus may include a chip, or may include a chip and another discrete device.

For technical effects brought by any design manner in the tenth aspect to the fifteenth aspect, refer to technical effects brought by different design manners in the second aspect. Details are not described herein again.

According to a sixteenth aspect, a residential gateway is provided. The residential gateway has a function of implementing the method according to the third aspect. The function may be implemented by hardware or may be implemented by hardware by executing corresponding software. The hardware or the software includes one or more modules corresponding to the foregoing function.

According to a seventeenth aspect, a residential gateway is provided, and includes a processor and a memory. The memory is configured to store a computer-executable instruction. When the residential gateway runs, the processor executes the computer-executable instruction stored in the memory, to enable the residential gateway to perform the authentication method according to any design in the third aspect.

According to an eighteenth aspect, a residential gateway is provided, and includes a processor. The processor is configured to be coupled to a memory and read an instruction in the memory, to perform the authentication method according to any design in the third aspect based on the instruction.

According to a nineteenth aspect, a computer-readable storage medium is provided. The computer-readable storage medium stores an instruction. When the instruction is run on a computer, the computer is enabled to perform the authentication method according to any design in the third aspect.

According to a twentieth aspect, a computer program product including an instruction is provided. When the computer program product is run on a computer, the computer is enabled to perform the authentication method according to any design in the third aspect.

According to a twenty-first aspect, an apparatus (for example, the apparatus may be a chip system) is provided. The apparatus includes a processor configured to support a residential gateway to implement a function related to the third aspect, for example, verifying validity of an access location of the residential gateway based on the first link information and the second link information. In a possible design, the apparatus further includes a memory. The memory is configured to store a program instruction and data that are required by the residential gateway. When the apparatus is a chip system, the apparatus may include a chip, or may include a chip and another discrete device.

For technical effects brought by any design manner in the sixteenth aspect to the twenty-first aspect, refer to technical effects brought by different design manners in the third aspect. Details are not described herein again.

According to a twenty-second aspect, an authentication system is provided. The authentication system includes a network device and a wireline access network device. The wireline access network device is configured to send first link information, where the first link information is used to represent an access location of a residential gateway. The network device is configured to receive the first link information. The network device is further configured to obtain subscription information of the residential gateway, where the subscription information of the residential gateway includes second link information of the residential gateway, and the second link information is used to represent a location of the residential gateway. The network device is further configured to verify validity of the access location of the residential gateway based on the first link information and the second link information.

In a possible design, the authentication system further includes the residential gateway. The subscription information of the residential gateway further includes second virtual interface information of the residential gateway, where the second virtual interface information is used to identify a service type of the residential gateway. The residential gateway is configured to send first virtual interface information, where the first virtual interface information is used to represent a current service type of the residential gateway. The network device is configured to receive the first virtual interface information and verifies validity of a current service of the residential gateway based on the first virtual interface information and the second virtual interface information.

In a possible design, the authentication system further includes an access gateway function network element. The access gateway function network element is further configured to obtain a second key, and determine a third key based on the second key and the first virtual interface information, where the second key is a temporary key between the access gateway function network element and the residential gateway, and the third key is a session key between the access gateway function network element and the residential gateway. The residential gateway is further configured to determine the third key based on the second key and the first virtual interface information.

In a possible design, the network device is a mobility management network element. The mobility management network element is further configured to obtain a first key, where the first key is a temporary key between the mobility management network element and the residential gateway. The mobility management network element is further configured to determine the second key based on the first key, an identifier of a non-3GPP network, and a classification identifier of the non-3GPP network, and send the second key to the access gateway function network element. That the access gateway function network element is further configured to obtain a second key includes: the access gateway function network element is further configured to receive the second key from the mobility management network element.

For technical effects brought by any possible implementation in the twenty-second aspect, refer to technical effects brought by different design manners in the first aspect. Details are not described herein again.

According to a twenty-third aspect, an authentication system is provided. The authentication system includes a mobility management network element and an access gateway function network element. The mobility management network element is configured to obtain a first key, where the first key is a temporary key between the mobility management network element and a residential gateway. The mobility management network element is further configured to determine a second key based on the first key, an identifier of a non-3GPP network, and a classification identifier of the non-3GPP network. The mobility management network element is further configured to send the second key to the access gateway function network element. The access gateway function network element is configured to receive the second key from the mobility management network element.

In a possible design, the authentication system further includes the residential gateway. The residential gateway is configured to obtain the first key, where the first key is the temporary key between the mobility management network element and the residential gateway. The residential gateway is further configured to determine the second key based on the first key, the identifier of the non-3GPP network, and the classification identifier of the non-3GPP network.

For technical effects brought by any possible implementation in the twenty-third aspect, refer to technical effects brought by different design manners in the first aspect or the second aspect. Details are not described herein again.

These aspects or other aspects of this application are more concise and comprehensible in the following descriptions of the embodiments.

DESCRIPTION OF EMBODIMENTS

The following describes the technical solutions in the embodiments of this application with reference to the accompanying drawings in the embodiments of this application. In the description of this application, "/" represents an "or" relationship between associated objects unless otherwise specified. For example, A/B may represent A or B. A term "and/or" in this application indicates only an association relationship for describing associated objects and indicates that three relationships may exist. For example, A and/or B may indicate the following three cases: Only A exists, both A and B exist, and only B exists, where A and B may be singular or plural. In addition, in the descriptions of this application, "a plurality of" means two or more than two. "At least one item (piece) of the following" or a similar expression thereof means any combination of these items, including a singular item (piece) or any combination of plural items (pieces). For example, at least one of a, b, or c may indicate: a, b, c, a and b, a and c, b and c, or a, b, and c, where a, b, and c may be singular or plural. In addition, to clearly describe the technical solutions in the embodiments of this application, terms such as "first" and "second" are used in the embodiments of this application to distinguish between same items or similar items that have same or similar functions and purposes. A person skilled in the art may understand that the terms such as "first" and "second" do not limit a quantity or an execution sequence, and the terms such as "first" and "second" do not indicate a definite difference.

In addition, a network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the network architecture and the emergence of a new service scenario, the technical solutions provided in the embodiments of this application are also applicable to similar technical problems.

Figure 1:
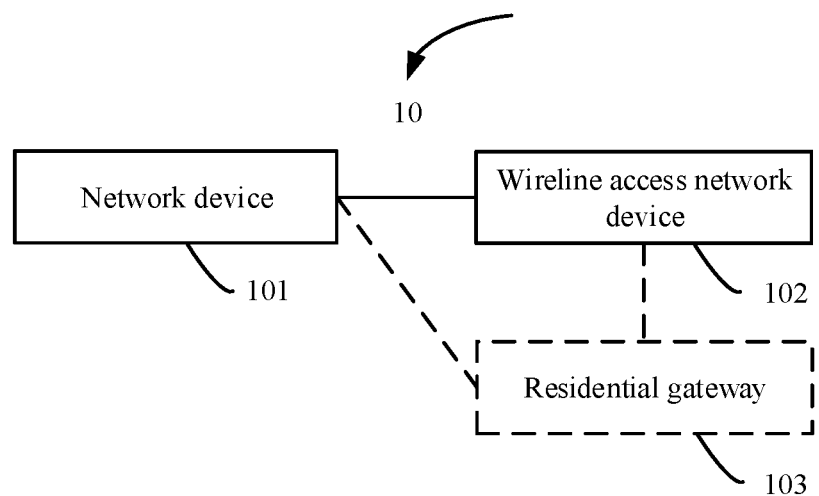
FIG. 1 is a schematic architectural diagram 1 of an authentication system according to an embodiment of this application.

FIG. 1 shows an authentication system 10 according to an embodiment of this application. The authentication system 10 includes a network device 101 and a wireline access network device 102.

The wireline access network device 102 is configured to send first link information. The first link information is used to represent an access location of a residential gateway.

The network device 101 is configured to receive the first link information, and obtain subscription information of the residential gateway. The subscription information of the residential gateway includes second link information of the residential gateway, and the second link information is used to represent a location of the residential gateway.

The network device 101 is further configured to verify validity of the access location of the residential gateway based on the first link information and the second link information.

Optionally, link information (including the first link information or the second link information) in the embodiment of this application may be, for example, an address of a switch or a port number. This is not specifically limited in the embodiment of this application.

Optionally, the network device 101 in the embodiment of this application may be, for example, a mobility management network element, a unified data management network element, or an authentication service function network element. This is not specifically limited in the embodiment of this application.

Optionally, the residential gateway in the embodiment of this application may alternatively be referred to as relay user equipment, a terminal device, or another name. This is not specifically limited in the embodiment of this application.

Optionally, the network device 101 and the wireline access network device 102 in the embodiment of this application may directly communicate with each other, or may communicate with each other through forwarding by using another device. This is not specifically limited in the embodiment of this application.

In the authentication system provided in the embodiment of this application, the network device may obtain the first link information that represents the access location of the home network element and the second link information of the residential gateway, and may verify the validity of the access location of the residential gateway based on the first link information and the second link information. Therefore, according to the authentication system provided in the embodiment of this application, the validity of the access location of the residential gateway can be verified in a fixed-mobile convergence architecture.

Optionally, as shown in FIG. 1, the authentication system 10 provided in the embodiment of this application may further include a residential gateway 103. The subscription information of the network device 101 further includes second virtual interface information of the residential gateway 103. The second virtual interface information is used to identify a service type of the residential gateway 103.

The residential gateway 103 is configured to send first virtual interface information. The first virtual interface information is used to represent a current service type of the residential gateway.

The network device 101 is further configured to receive the first virtual interface information, and verify validity of a current service of the residential gateway 103 based on the first virtual interface information and the second virtual interface information.

Optionally, virtual interface information (including the first virtual interface information or the second virtual interface information) in the embodiment of this application may be, for example, a virtual local area network identifier (VLAN) identifier (ID), or may be, for example, at least one of a virtual path identifier (VPI) and a virtual channel identifier (VCI). This is not specifically limited in the embodiment of this application.

Optionally, the residential gateway 103 and the network device 101 in the embodiment of this application may directly communicate with each other, or may communicate with each other through forwarding by using another device (for example, the wireline access network device 102 in FIG. 1). This is not specifically limited in the embodiment of this application.

According to the foregoing authentication system, the network device may obtain the first virtual interface information that represents the current service type of the home network element and the second virtual interface information of the residential gateway, and may verify the validity of the current service of the residential gateway based on the first virtual interface information and the second virtual interface information. Therefore, according to the authentication system provided in the embodiment of this application, the validity of the current service of the residential gateway can be verified in the fixed-mobile convergence architecture.

Figure 2:
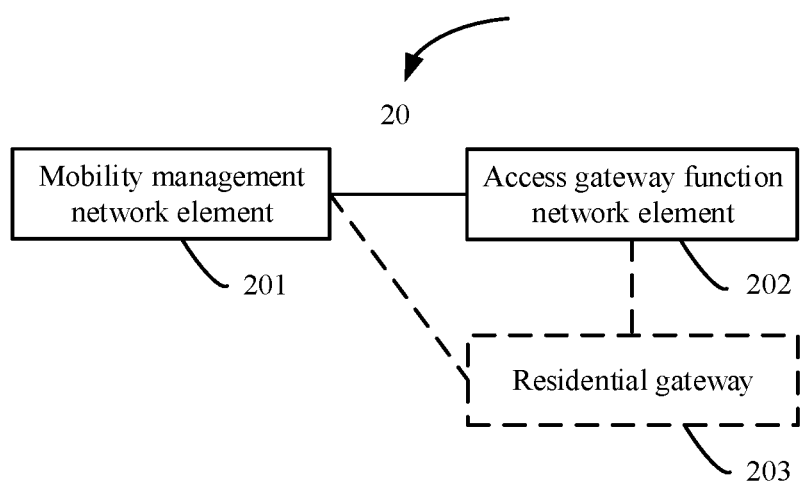
FIG. 2 is a schematic architectural diagram 2 of an authentication system according to an embodiment of this application.

Optionally, FIG. 2 shows another authentication system 20 according to an embodiment of this application. The authentication system 20 includes a mobility management network element 201 and an access gateway function network element 202.

The mobility management network element 201 is configured to obtain a first key. The first key is a temporary key between the mobility management network element 201 and a residential gateway.

The mobility management network element 201 is further configured to determine a second key based on the first key, an identifier of a non-3GPP network, and a classification identifier of the non-3GPP network, and send the second key to the access gateway function network element 202. The second key is a temporary key between the access gateway function network element 202 and the residential gateway.

The access gateway function network element 202 is configured to receive the second key from the mobility management network element 201.

Optionally, in the embodiment of this application, the access gateway function network element 202 may be further configured to encrypt, by using the second key, data to be sent to the residential gateway. This is not specifically limited in the embodiment of this application.

Optionally, as shown in FIG. 2, the authentication system 20 provided in the embodiment of this application may further include a residential gateway 203.

The residential gateway 203 is configured to obtain a first key. The first key is a temporary key between the mobility management network element 201 and the residential gateway 203.

The residential gateway 203 is further configured to determine a second key based on the first key, an identifier of a non-3GPP network, and a classification identifier of the non-3GPP network. The second key is a temporary key between the access gateway function network element 202 and the residential gateway 203.

Optionally, in the embodiment of this application, the residential gateway 203 may be further configured to encrypt, by using the second key, data to be sent to the access gateway function network element 202. This is not specifically limited in the embodiment of this application.

Optionally, in the embodiment of this application, the classification identifier of the non-3GPP network is used to indicate that an access manner of the residential gateway is fixed network access, wireless fidelity (Wi-Fi) access, or the like. This is not specifically limited in the embodiment of this application.

Optionally, the mobility management network element 201 and the access gateway function network element 202 in the embodiment of this application may directly communicate with each other, or may communicate with each other through forwarding by using another device. This is not specifically limited in the embodiment of this application.

Optionally, the residential gateway 203 and the access gateway function network element 202 in the embodiment of this application may directly communicate with each other, or may communicate with each other through forwarding by another device. This is not specifically limited in the embodiment of this application.

In a current key architecture, a residential gateway simultaneously accesses a plurality of types of non-3GPP networks, for example, performing an Internet access service by using a fixed network, or performing a voice over Wi-Fi service (VoWiFi) by using Wi-Fi, and derives required keys by using a same key derivation method. To be specific, a key used in a non-3GPP network is derived by using a same key derivation method, and isolation between different types of access manners in the non-3GPP network cannot be implemented. Therefore, in the embodiment of this application, when deriving a key required by a non-3GPP network, a residential gateway or a mobility management network element considers a classification identifier of the non-3GPP network, and determines a second key based on a first key, an identifier of the non-3GPP network identifier, and the classification identifier of the non-3GPP network. In this way, different types of access manners in the non-3GPP network can be isolated.

Optionally, the authentication system shown in FIG. 1 or FIG. 2 may be applied to a current fixed-mobile convergence network architecture or another future network. This is not specifically limited in the embodiment of this application.

Figure 3:
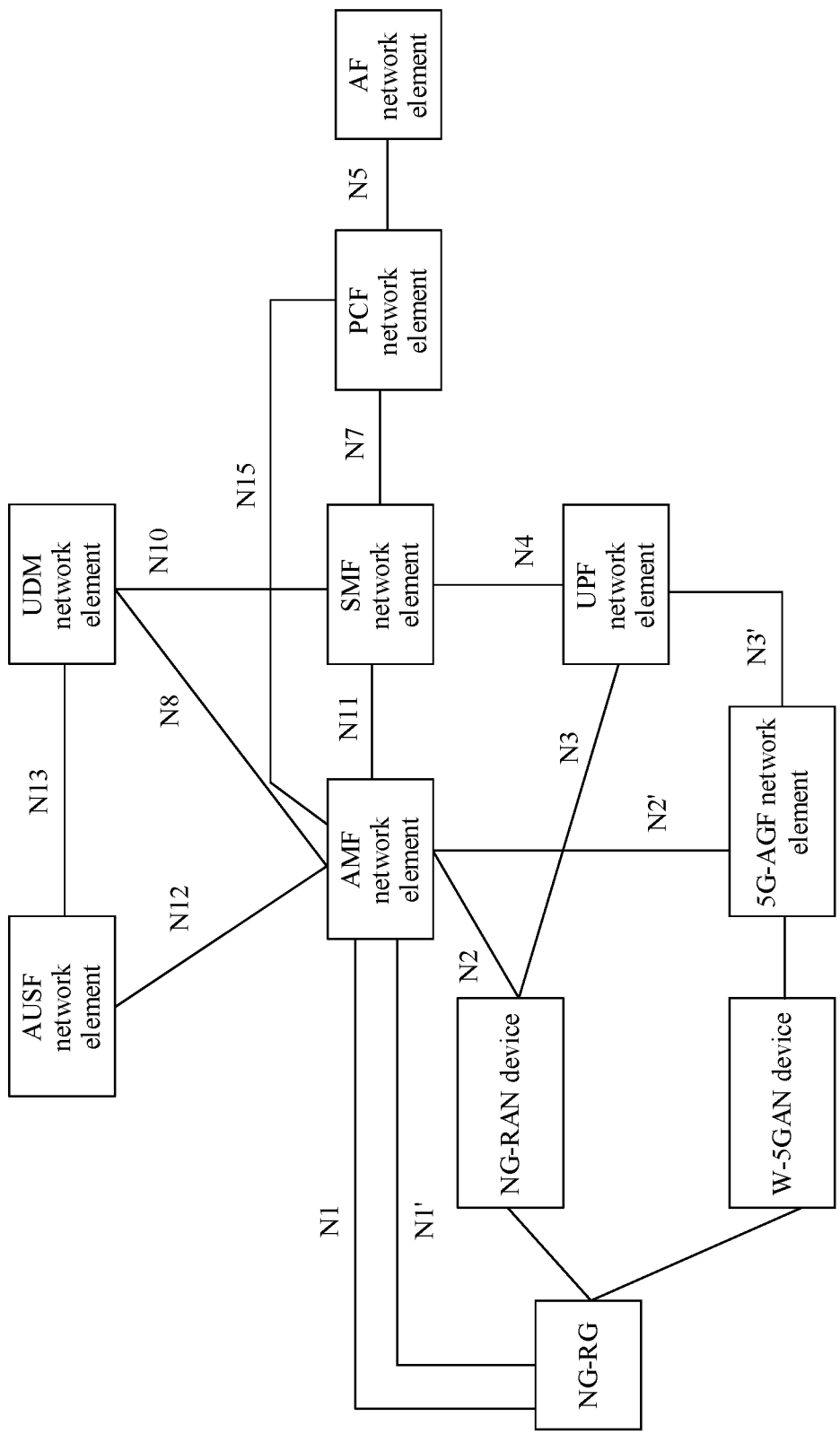
FIG. 3 is a schematic application diagram of an authentication system according to an embodiment of this application in a fixed-mobile convergence network architecture.

For example, assuming that the authentication system shown in FIG. 1 or FIG. 2 is applied to a current fixed-mobile convergence network architecture, as shown in FIG. 3, a network element or an entity corresponding to the foregoing mobility management network element may be an access and mobility management function (AMF) network element in the fixed-mobile convergence network architecture. A network element or an entity corresponding to the foregoing unified data management network element may be a unified data management (UDM) network element in the fixed-mobile convergence network architecture. A network element or an entity corresponding to the foregoing authentication service function network element may be an authentication server function (AUSF) network element in the fixed-mobile convergence network architecture. A network element or an entity corresponding to the foregoing wireline access network device may be a W-5GAN device in the fixed-mobile convergence network architecture. A network element or an entity corresponding to the residential gateway may be an NG-RG in the fixed-mobile convergence network architecture. A network element or an entity corresponding to the access gateway function network element may be a 5G-AGF network element in the fixed-mobile convergence network architecture, and the 5G-AGF network element may also be referred to as a fixed network access gateway function (FAGF) network element. This is not specifically limited in the embodiment of this application.

In addition, as shown in FIG. 3, the fixed-mobile convergence network architecture may further include a next generation radio access network (NG-RAN) device, a policy control function (PCF) network element, a session management function (SMF) network element, a user plane function (UPF) network element, an application function (AF) network element, or the like. For details, refer to an existing fixed-mobile convergence network architecture, which is not described herein.

As shown in FIG. 3, on a 3GPP side, an NG-RG accesses a 5G core network by using an NG-RAN device. In this case, the NG-RG communicates with an AMF network element through a next generation network (Next generation, N) 1 interface (N1 for short), the NG-RG communicates with the NG-RAN device in an air interface manner, the NG-RAN device communicates with the AMF network element through an N2 interface (N2 for short), and the NG-RAN device communicates with a UPF network element through an N3 interface (N3 for short). On a non-3GPP side, an NG-RG accesses a 5G core network by using a W-5GAN device and a 5G-AGF network element. In this case, the NG-RG communicates with an AMF network element through an N1' interface (N1' for short), the NG-RG communicates with the W-5GAN device in a wireline manner, the 5G-AGF network element communicates with the AMF network element through an N2' interface (N2' for short), and the 5G-AGF network element communicates with a UPF network element through an N3' interface (N3' for short). In addition, the AMF network element communicates with an SMF network element through an N11 interface (N11 for short), the AMF network element communicates with a PCF network element through an N15 interface (N15 for short), the AMF network element communicates with a UDM network element through an N8 interface (N8 for short), and the AMF network element communicates with an AUSF network element through an N12 interface (N12 for short). The SMF network element communicates with the PCF network element through an N7 interface (N7 for short), the SMF network element communicates with the UPF network element through an N interface 4 (N4 for short), the SMF network element communicates with the UDM network element through an N10 interface (N10 for short), the UDM network element communicates with an AUSF network element through an N13 interface (N13 for short) and the PCF network element communicates with an AF network element through an N5 interface (N5 for short).

It should be noted that a name of each network element and names of the interfaces between the network elements in FIG. 3 are merely examples, and the interfaces may have other names during specific implementation. This is not specifically limited in the embodiment of this application.

In addition, it should be noted that control plane network elements such as the AMF network element, SMF network element, UDM network element, PCF network element, AUSF network element, or AF network element in the fixed-mobile convergence network architecture shown in FIG. 3 may alternatively interact with each other through a service-oriented interface. For example, the AMF network element may provide an external service-oriented interface Namf. The SMF network element may provide an external service-oriented interface Nsmf. The UDM may provide an external service-oriented interface Nudm. The PCF network element may provide an external service-oriented interface Npcf. The AUSF network element may provide an external service-oriented interface Nausf. The AF network element may provide an external service-oriented interface Naf. For related descriptions, refer to a diagram of a 5G system architecture in the 23501 standard. Details are not described herein.

Optionally, the network device 101 in FIG. 1, or the mobility management network element 201 or the residential gateway 203 in FIG. 2 in the embodiment of this application may be implemented by one device, may be jointly implemented by a plurality of devices, or may be a function module in a device. This is not specifically limited in the embodiment of this application. It may be understood that the foregoing functions may be network elements in a hardware device, or may be software functions running on special-purpose hardware, or may be virtualized functions instantiated on a platform (for example, a cloud platform).

Figure 4:
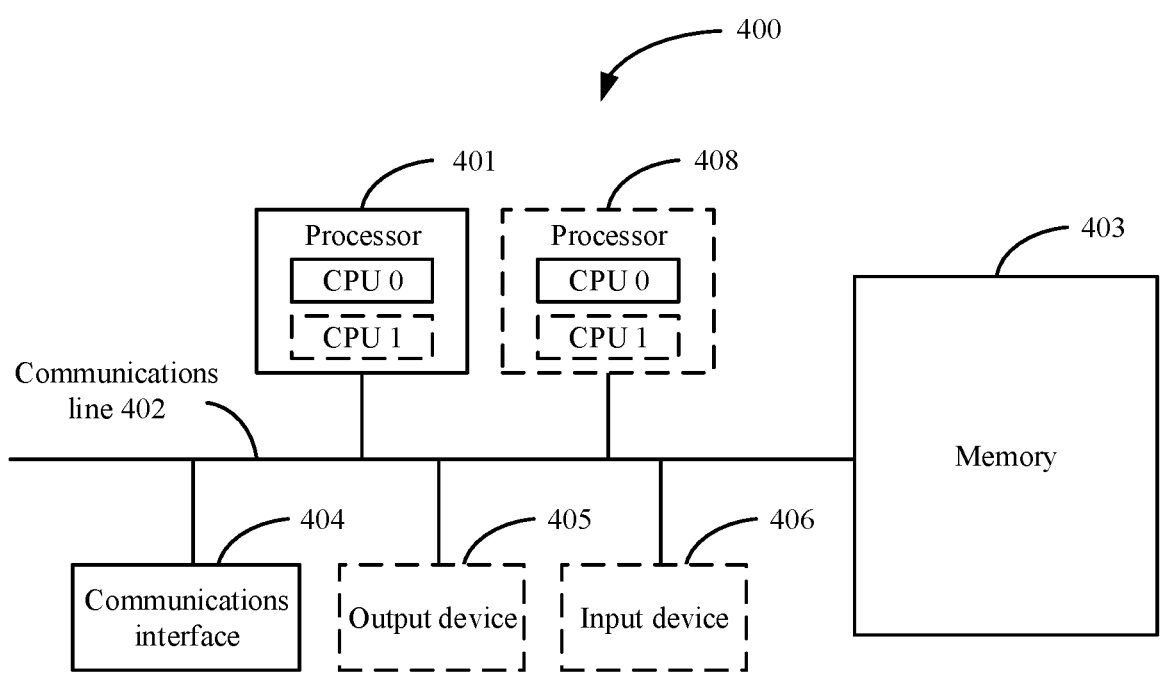
FIG. 4 is a schematic diagram of a hardware structure of a communications device according to an embodiment of this application.

For example, the network device 101 in FIG. 1, or the mobility management network element 201 or the residential gateway 203 in FIG. 2 in the embodiment of this application may be implemented by using a communications device 400 in FIG. 4. FIG. 4 is a schematic diagram of a hardware structure of a communications device 400 according to an embodiment of this application. A communications device 400 includes a processor 401, a communications line 402, a memory 403, and at least one communications interface 404 (in FIG. 4, a communications interface 404 is merely used as an example for description).

The processor 401 may be a general-purpose central processing unit (CPU), a microprocessor, an application-specific integrated circuit (ASIC), or one or more integrated circuits configured to control program execution of the solutions of this application.

The communications line 402 may include a path for transmitting information between the foregoing components.

The communications interface 404 is configured to communicate with another device or a communications network such as Ethernet, a radio access network (RAN), or a wireless local area network (WLAN) by using any apparatus such as a transceiver.

The memory 403 may be a read-only memory (ROM) or another type of static storage device that can store static information and an instruction, or a random access memory (RAM) or another type of dynamic storage device that can store information and an instruction. Alternatively, the memory 403 may be an electrically erasable programmable read-only memory (EEPROM), a compact disc read-only memory (CD-ROM) or another compact disc storage, optical disc storage (including a compact optical disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer. However, the memory 403 is not limited thereto. The memory may exist independently, and is connected to the processor through the communications line 402. Alternatively, the memory may be integrated with the processor.

The memory 403 is configured to store a computer-executable instruction for executing the solutions of this application, and the processor 401 controls the execution. The processor 401 is configured to execute the computer-executable instruction stored in the memory 403, to implement an authentication method provided in the following embodiments of this application.

Optionally, the computer-executable instruction in the embodiment of this application may also be referred to as application program code. This is not specifically limited in the embodiment of this application.

During a specific implementation, in an embodiment, the processor 401 may include one or more CPUs, for example, a CPU 0 and a CPU 1 in FIG. 4.

During a specific implementation, in an embodiment, the communications device 400 may include a plurality of processors, for example, the processor 401 and a processor 408 in FIG. 4. Each of the processors may be a single-core (single-CPU) processor or a multi-core (multi-CPU) processor. The processor herein may be one or more devices, circuits, and/or processing cores configured to process data (for example, a computer program instruction).

During a specific implementation, in an embodiment, the communications device 400 may further include an output device 405 and an input device 406. The output device 405 communicates with the processor 401, and may display information in a plurality of manners. For example, the output device 405 may be a liquid crystal display (LCD), a light emitting diode (LED) display device, a cathode ray tube (CRT) display device, a projector, or the like. The input device 406 communicates with the processor 401, and may receive an input of a user in a plurality of manners. For example, the input device 406 may be a mouse, a keyboard, a touchscreen device, a sensing device, or the like.

The communications device 400 may be a general-purpose device or a special-purpose device. During specific implementation, the communications device 400 may be a desktop computer, a portable computer, a network server, a palmtop computer (PDA), a mobile phone, a tablet computer, a wireless terminal device, an embedded device, or a device with a structure similar to that in FIG. 4. A type of the communications device 400 is not limited in the embodiment of this application.

The following describes in detail an authentication method provided in the embodiment of this application with reference to FIG. 1 to FIG. 4.

It should be noted that in the following embodiments of this application, names of messages between network elements, names of parameters in messages, or the like are merely examples, and there may be other names during specific implementation. This is not specifically limited in the embodiment of this application.

Figure 5A:
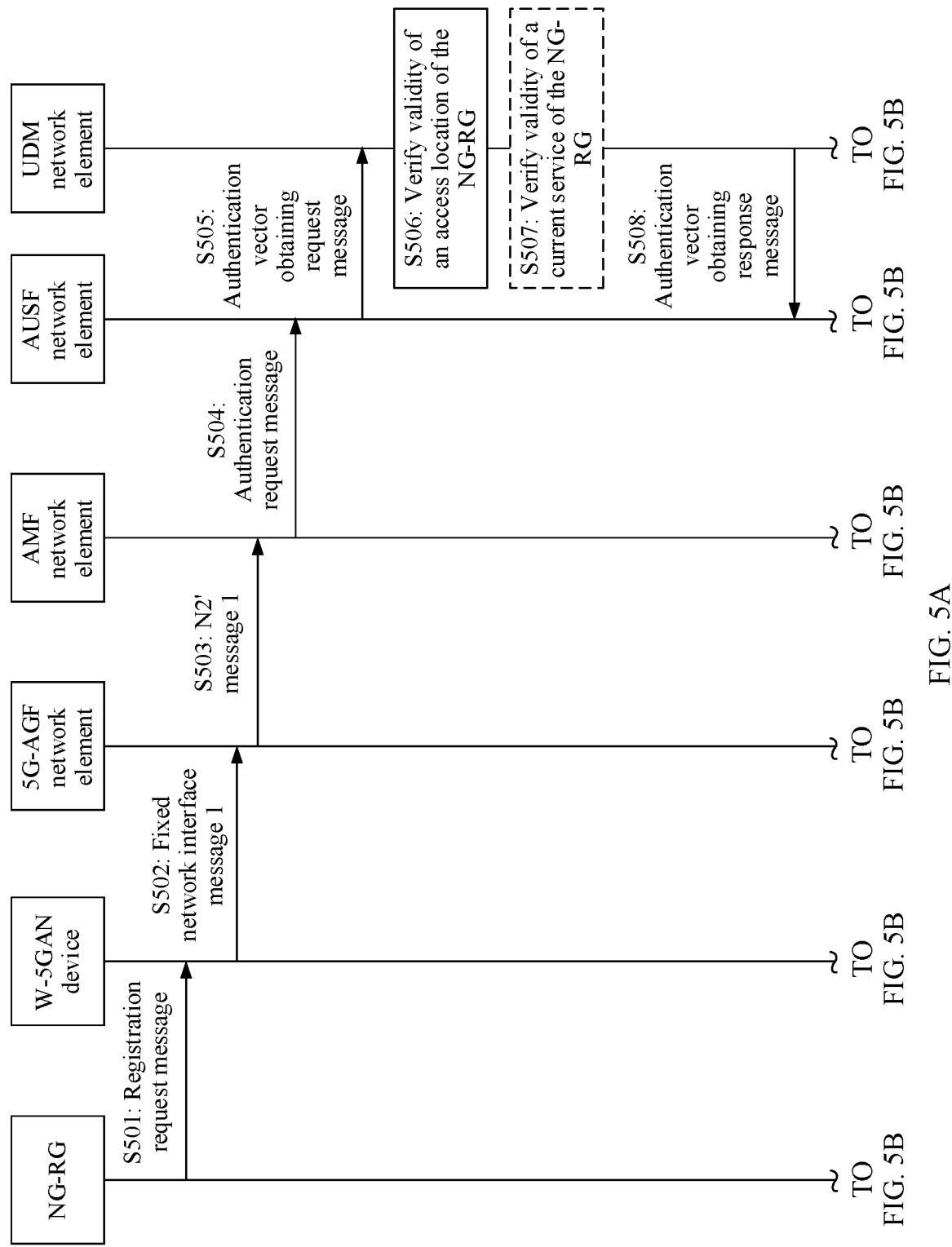
FIG. 5A, FIG. 5B, and FIG. 5C are a schematic flowchart 1 of an authentication method according to an embodiment of this application.
Figure 5B:
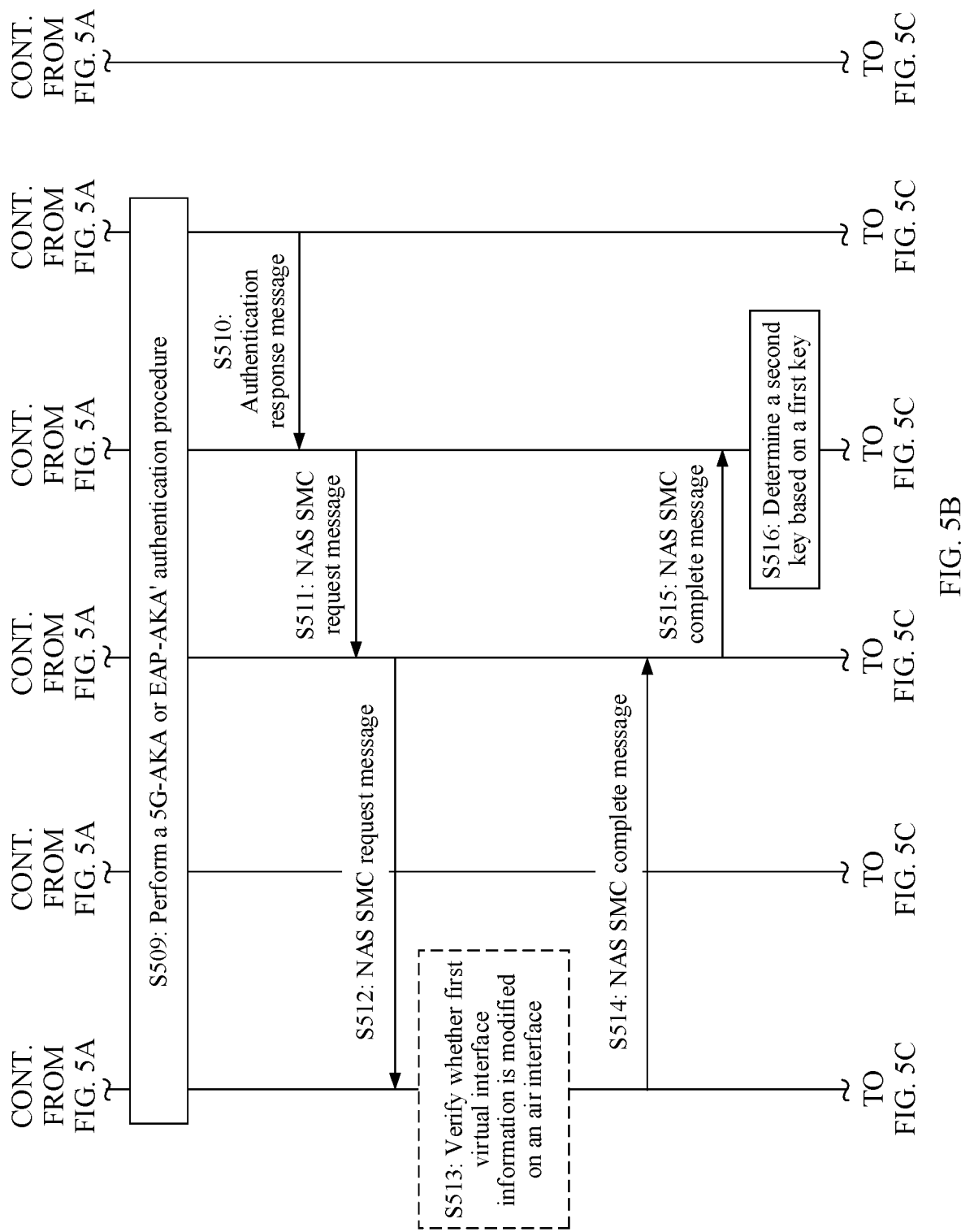
Figure 5C:
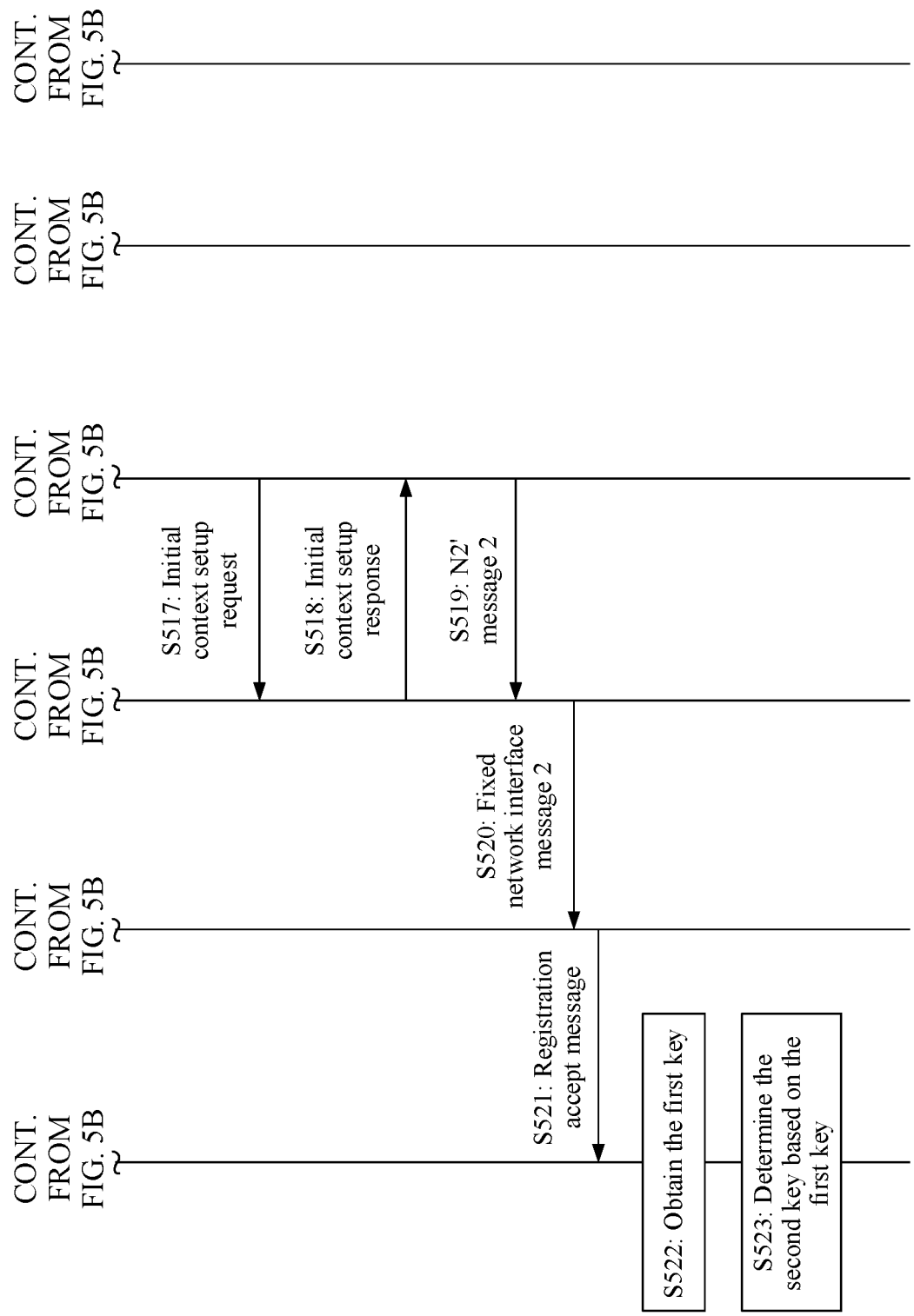

First, an example in which the authentication system shown in FIG. 1 or FIG. 2 is applied to the fixed-mobile convergence network architecture shown in FIG. 3 and the network device is a UDM network element is used. FIG. 5A, FIG. 5B, and FIG. 5C show an authentication method according to an embodiment of this application. The authentication method includes the following steps.

S501: An NG-RG sends a registration request message to a W-5GAN device.

Correspondingly, the W-5GAN device receives the registration request message from the NG-RG.

The registration request message may include an identifier of the NG-RG, and the identifier is denoted as an RGID. This is not specifically limited in the embodiment of this application.

Optionally, the registration request message may include first virtual interface information. The first virtual interface information is used to represent a current service type of the NG-RG. For related descriptions of the first virtual interface information, refer to the foregoing authentication system part. Details are not described herein again.

S502: The W-5GAN device sends a fixed network interface message 1 to a 5G-AGF network element.

Correspondingly, the 5G-AGF network element receives the fixed network interface message 1 from the W-5GAN device.

The fixed network interface message 1 includes the registration request message and newly added first link information, and the first link information is used to represent an access location of the NG-RG. For related descriptions of the first link information, refer to the foregoing authentication system part. Details are not described herein again.

S503: The 5G-AGF network element sends an NT message 1 to an AMF network element.

Correspondingly, the AMF network element receives the NT message 1 from the 5G-AGF network element. The NT message 1 includes the registration request message and the first link information.

S504: The AMF network element sends an authentication request message to an AUSF network element, so that the AUSF network element receives the authentication request message from the AMF network element. The authentication request message includes the first link information.

Optionally, if the registration request message includes the first virtual interface information, the authentication request message may further include the first virtual interface information. This is not specifically limited in the embodiment of this application.

In a possible implementation, when a service-oriented interface is used, the authentication request message may invoke, corresponding to the AMF network element, a Nausf_UEauthentication_authenticate request message of the AUSF network element. This is not specifically limited in the embodiment of this application.

S505: The AUSF network element sends an authentication vector obtaining request message to a UDM network element.

Correspondingly, the UDM network element receives the authentication vector obtaining request message from the AUSF network element. The authentication vector obtaining request message includes the first link information.

Optionally, if the authentication request message includes the first virtual interface information, the authentication vector obtaining request message may further include the first virtual interface information. This is not specifically limited in the embodiment of this application.

In a possible implementation, when a service-oriented interface is used, the authentication vector obtaining request message may invoke, corresponding to the AUSF network element, a Nudm_UEauthentication_get request message of the UDM network element. This is not specifically limited in the embodiment of this application.

S506: The UDM network element verifies validity of an access location of the NG-RG.

In the embodiment of this application, the UDM network element may verify the validity of the access location of the NG-RG based on the first link information and second link information of the NG-RG, that is in subscription information of the NG-RG, and that is stored in the UDM network element. The second link information of the NG-RG is used to represent a location of the NG-RG. For related descriptions of the second link information, refer to the foregoing authentication system part. Details are not described herein again.

Optionally, in the embodiment of this application, there may be one or more pieces of second link information. This is not specifically limited in the embodiment of this application.

Optionally, in the embodiment of this application, if there is one piece of second link information, that the UDM network element verifies validity of an access location of the NG-RG based on the first link information and the second link information may include: if the first link information matches the second link information, the UDM network element determines that the access location of the NG-RG is valid.

Alternatively, optionally, in the embodiment of this application, if there are a plurality of pieces of second link information, that the UDM network element verifies validity of an access location of the NG-RG based on the first link information and the second link information may include: if the first link information matches any one of the plurality of pieces of second link information, the UDM network element determines that the access location of the NG-RG is valid.

Optionally, in the embodiment of this application, link information matching means all or partial link information matching. For example, that the first link information matches the second link information means that the first link information matches partial or all information of the second link information; or, that the first link information matches any one of the plurality of pieces of second link information means that the first link information matches partial or all information of any one of the plurality of pieces of second link information.

For example, if link information includes an address of a switch and a port number, the partial information matching may be that an address of a switch of the first link information is the same as that of the second link information or any one of the plurality of pieces of second link information, but a port number of the first link information is different from that of the second link information or any one of the plurality of pieces of second link information; or, the partial information matching may be that an address of a switch of the first link information is different from that of the second link information or any one of the plurality of pieces of second link information, but a port number of the first link information is the same as that of the second link information or any one of the plurality of pieces of second link information. The all information matching may be that an address of a switch and a port number of the first link information are the same as these of the second link information or any one of the plurality of pieces of second link information. This is uniformly described herein, and details are not described below again.

Optionally, in the embodiment of this application, the UDM network element may alternatively verify validity of the access location of the NG-RG after determining, based on the subscription information of the NG-RG, according to a carrier policy, or the like, that the validity of the access location of the NG-RG needs to be verified. This is not specifically limited in the embodiment of this application.

S507: Optionally, if the authentication vector obtaining request message in step S505 includes the first virtual interface information, the UDM network element verifies validity of a current service of the NG-RG.

In the embodiment of this application, the UDM network element may verify the validity of the current service of the NG-RG based on the first virtual interface information and second virtual interface information of the NG-RG, that is in subscription information of the NG-RG, and that is stored in the UDM network element. The second virtual interface information of the NG-RG is used to represent a service type of the NG-RG. For related descriptions of the second virtual interface information, refer to the foregoing authentication system part. Details are not described herein again.

Optionally, in the embodiment of this application, there may be one or more pieces of second virtual interface information. This is not specifically limited in the embodiment of this application.

Optionally, in the embodiment of this application, if there is one piece of second virtual interface information, that the UDM network element verifies validity of a current service of the NG-RG based on the first virtual interface information and the second virtual interface information may include: if the first virtual interface information matches the second virtual interface information, the UDM network element determines that the current service of the NG-RG is valid.

Alternatively, optionally, in the embodiment of this application, if there are a plurality of pieces of second virtual interface information, that the UDM network element verifies validity of a current service of the NG-RG based on the first virtual interface information and the second virtual interface information may include: if the first virtual interface information matches any one of the plurality of pieces of second virtual interface information, the UDM network element determines that the current service of the NG-RG is valid.

Optionally, in the embodiment of this application, virtual interface information matching means all or partial virtual interface information matching. For example, that the first virtual interface information matches the second virtual interface information means that the first virtual interface information matches partial or all information of the second virtual interface information; or, that the first virtual interface information matches any one of the plurality of pieces of second virtual interface information means that the first virtual interface information matches partial or all information of any one of the plurality of pieces of second virtual interface information.

For example, if virtual interface information includes a VPI and a VCI, the partial information matching may be that a VPI of the first virtual interface information is the same as that of the second virtual interface information or any one of the plurality of pieces of second virtual interface information, but a VCI of the first virtual interface information is different from that of the second virtual interface information or any one of the plurality of pieces of second virtual interface information; or, the partial information matching may be that a VCI of the first virtual interface information is the same as that of the second virtual interface information or any one of the plurality of pieces of second virtual interface information, but a VPI of the first virtual interface information is different from that of the second virtual interface information or any one of the plurality of pieces of second virtual interface information. The all information matching may be that a VPI and a VCI of the first virtual interface information are the same as these of the second virtual interface information or any one of the plurality of pieces of second virtual interface information. This is uniformly described herein, and details are not described below again.

Optionally, in the embodiment of this application, the UDM network element may alternatively verify validity of the current service of the NG-RG after determining, based on the subscription information of the NG-RG, according to a carrier policy, or the like, that the validity of the current service of the NG-RG needs to be verified. This is not specifically limited in the embodiment of this application.

Further, in the embodiment of this application, if the UDM network element verifies that the access location of the NG-RG is valid, the authentication method provided in the embodiment of this application may further include the following step.

S508: The UDM network element sends an authentication vector obtaining response message to the AUSF network element.

Correspondingly, the AUSF network element receives the authentication vector obtaining response message from the UDM network element.

In a possible implementation, when a service-oriented interface is used, the authentication vector obtaining response message may invoke, corresponding to the AUSF network element, a Nudm_UEauthentication_get response message of the UDM network element. This is not specifically limited in the embodiment of this application.

S509: Perform a 5G-AKA or EAP-AKA' authentication procedure. For details, refer to the descriptions of authentication procedures in section 6.1.3 in the 3GPP 33501. Details are not described herein again.

S510: The AUSF network element sends an authentication response message to the AMF network element.

Correspondingly, the AMF network element receives the authentication response message from the AUSF network element.

Optionally, in the embodiment of this application, if 5G-AKA or EAP-AKA' authentication succeeds, the authentication response message in step S510 may include authentication success indication information that is used to indicate that AKA authentication succeeds and that validity authentication on the access location of the NG-RG succeeds.

For example, in the embodiment of this application, if the 5G-AKA authentication procedure is performed in step S509, the success indication information may be, for example, a successful authentication result; or, if the EAP-AKA' authentication procedure is performed in step S509, the success indication information may be, for example, an EAP success message. This is not specifically limited in the embodiment of this application.

In a possible implementation, when a service-oriented interface is used, the authentication request message may invoke, corresponding to the AMF network element, a Nausf_UEauthentication_authenticate response message of the AUSF network element. This is not specifically limited in the embodiment of this application.

S511: The AMF network element sends a non-access stratum (NAS) security mode command (SMC) request message to the 5G-AGF network element.

Correspondingly, the 5G-AGF network element receives the NAS SMC request message from the AMF network element.

Optionally, in the embodiment of this application, if the AMF network element can obtain the first virtual interface information, the NAS SMC request message may include the first virtual interface information. This is not specifically limited in the embodiment of this application.

It should be noted that the NAS SMC request message in the embodiment of this application has integrity protection, information in the NAS SMC request message can be prevented from being tampered with. This is uniformly described herein, and details are not described below again.

S512: The 5G-AGF network element sends the NAS SMC request message to the NG-RG.

Correspondingly, the NG-RG receives the NAS SMC request message from the 5G-AGF network element.

S513: Optionally, if the NAS SMC request message in step S512 includes the first virtual interface information, the NG-RG verifies whether the first virtual interface information is modified on an air interface.

For example, if the first virtual interface information included in the NAS SMC request message is the same as the first virtual interface information stored on the NG-RG, it may be determined that the first virtual interface information is not modified on the air interface; or, if the first virtual interface information included in the NAS SMC request message is different from the first virtual interface information stored on the NG-RG, it may be determined that the first virtual interface information is modified on the air interface.

Further, if the NG-RG verifies that the first virtual interface information is not modified on the air interface, the authentication method provided in the embodiment of this application further includes the following step.

S514: The NG-RG sends a NAS SMC complete message to the 5G-AGF network element.

Correspondingly, the 5G-AGF network element receives the NAS SMC complete message from the NG-RG.

S515: The 5G-AGF network element sends the NAS SMC complete message to the AMF network element.

Correspondingly, the AMF network element receives the NAS SMC complete message from the 5G-AGF network element.

S516: The AMF network element determines a second key based on a first key.

In the embodiment of this application, the first key is a temporary key between the AMF network element and the NG-RG, may be denoted as a Kamf, and is derived by a security anchor function (SEAF) network element (co-located with the AMF network element) based on a Kseaf. For details, refer to an existing key derivation manner. Details are not described herein. In addition, the AMF network element may derive a next-level key such as the second key based on the Kamf. This is not specifically limited in the embodiment of this application.

In a possible implementation, in the embodiment of this application, the AMF network element may determine the second key based on the first key, an identifier of a non-3GPP network, and a classification identifier of the non-3GPP network. The second key is a temporary key between the NG-RG and the 5G-AGF network element, and may be denoted as a Kagf.

Optionally, that the AMF network element determines the second key based on the first key, an identifier of a non-3GPP network, and a classification identifier of the non-3GPP network may include: the AMF network element determines the second key based on the first key, the identifier of the non-3GPP network, the classification identifier of the non-3GPP network, and a NAS message count value.

For example, the AMF network element determines the second key based on the first key, the identifier of the non-3GPP network, the classification identifier of the non-3GPP network, and a NAS message count value.

For example, the second key may be determined according to the following first formula, and the first formula is:

Kagf=KDF(Kamf, P0, P1, P2), where Kagf represents a second key; Kamf represents a first key; P0 is a NAS message count value; P1 is an identifier of a non-3GPP network, where according to an existing key architecture, an identifier of a 3GPP network may be, for example, 0x01, and an identifier of a 3GPP network may be, for example, 0x02; and P2 is a newly added parameter value and indicates a classification identifier of the non-3GPP network.

The classification identifier of the non-3GPP network is used to indicate that an access manner of the NG-RG is fixed network access or Wi-Fi access. For example, 0 indicates that the access manner of the NG-RG is the fixed network access, and 1 indicates that the access manner of the NG-RG is the Wi-Fi access. Alternatively, 1 indicates that the access manner of the NG-RG is the fixed network access, and 0 indicates that the access manner of the NG-RG is the Wi-Fi access.

For another example, 1 indicates that the access manner of the NG-RG is the fixed network access, and 2 indicates that the access manner of the NG-RG is the Wi-Fi access. Alternatively, 2 indicates that the access manner of the NG-RG is the fixed network access, and 1 indicates that the access manner of the NG-RG is the Wi-Fi access. This is not specifically limited in the embodiment of this application. In addition, the foregoing specific numeric value may be represented by using a binary system, an octal system, or a hexadecimal system.

The NAS message count value in the embodiment of this application may be, for example, an uplink NAS message count value or a downlink NAS message count value. This is uniformly described herein, and this is not specifically limited in the embodiment of this application.

In another possible implementation, in the embodiment of this application, the AMF network element may determine the second key based on the first key and a classification identifier of a non-3GPP network.

Optionally, that the AMF network element determines the second key based on the first key and a classification identifier of a non-3GPP network may include: the AMF network element determines the second key based on the first key, the classification identifier of the non-3GPP network, and a NAS message count value.

For example, the AMF network element determines the second key based on the first key, the classification identifier of the non-3GPP network, and a NAS message count value. For example, the second key may be determined according to the following second formula, and the second formula is:

Kagf=KDF(Kamf, P0, P1), where Kagf represents a second key; Kamf represents a first key; P0 is a NAS message count value; and P1 is an extended parameter value and indicates a classification identifier of a non-3GPP network.

The classification identifier of the non-3GPP network is used to indicate that an access manner of the NG-RG is fixed network access or Wi-Fi access. For example, 0x01 indicates that the access manner of the NG-RG is 3GPP access, 0x02 indicates that the access manner of the NG-RG is fixed network access, 0x03 indicates that the access manner of the NG-RG is Wi-Fi access, or the like. This is not specifically limited in the embodiment of this application.

S517: The AMF network element sends an initial context setup request to the 5G-AGF network element.

Correspondingly, the 5G-AGF network element receives the initial context setup request from the AMF network element.

The initial context setup request includes the second key.

Optionally, in the embodiment of this application, after obtaining the second key, the 5G-AGF network element may encrypt, by using the second key or a lower-layer key derived from the second key, data to be sent to the NG-RG. This is not specifically limited in the embodiment of this application.

S518: The 5G-AGF network element sends an initial context setup response to the AMF network element.

Correspondingly, the AMF network element receives the initial context setup response from the 5G-AGF network element.

S519: The AMF network element sends an N2' message 2 to the 5G-AGF network element.

Correspondingly, the 5G-AGF network element receives the NT message 2 from the AMF network element. The N2' message 2 includes a registration accept message.

Optionally, in the embodiment of this application, if 5G-AKA or EAP-AKA' authentication succeeds, the registration accept message may include authentication success indication information, to indicate that AKA authentication succeeds and an access location of the NG-RG is valid. This is not specifically limited in the embodiment of this application.

S520: The 5G-AGF network element sends a fixed network interface message 2 to the W-5GAN device.

Correspondingly, the W-5GAN device receives the fixed network interface message 2 from the 5G-AGF network element. The fixed network interface message 2 includes the registration accept message.

S521: The W-5GAN device sends the registration accept message to the NG-RG.

Correspondingly, the NG-RG receives the registration accept message from the W-5GAN device.

S522: The NG-RG obtains the first key.

The NG-RG may derive the first key based on a stored root key. For details, refer to an existing implementation. Details are not described herein.

S523: The NG-RG determines a second key based on the first key.

For a manner in which the NG-RG determines the second key based on the first key, refer to the manner in which the AMF network element determines the second key based on the first key in step S516. Details are not described herein again.

Optionally, in the embodiment of this application, after determining the second key, the NG-RG may encrypt, by using the second key or a lower-layer key derived from the second key, data to be sent to the 5G-AGF network element. This is not specifically limited in the embodiment of this application.

Optionally, in step S506 in the embodiment of this application, if the UDM network element verifies that the access location of the NG-RG is invalid, or if the UDM network element verifies that the current service of the NG-RG is invalid, the UDM network element sends an authentication failure indication to the AUSF network element, and optionally returns an authentication failure cause, for example, link information or virtual interface information matching fails. This is not specifically limited in the embodiment of this application. Further, the 5G-AKA or EAP-AKA' authentication procedure in step S509 may be not performed, and the AUSF network element may send the authentication failure indication to the NG-RG by using a procedure from step S510 to step S512. This is not specifically limited in the embodiment of this application.

In one aspect, the UDM network element may obtain the first link information that represents the access location of the NG-RG and the second link information of the NG-RG, and may verify validity of the access location of the NG-RG based on the first link information and the second link information. Therefore, according to the authentication method provided in the embodiment of this application, the validity of the access location of the NG-RG can be verified in a fixed-mobile convergence architecture. In another aspect, because the UDM network element may obtain the first virtual interface information that represents the current service type of the NG-RG and the second virtual interface information of the NG-RG, and may verify validity of the current service of the NG-RG based on the first virtual interface information and the second virtual interface information. Therefore, according to the authentication method provided in the embodiment of this application, the validity of the current service of the NG-RG may be verified in the fixed-mobile convergence architecture. In still another aspect, in the embodiment of this application, when deriving the second key required by the non-3GPP network, the NG-RG or the AMF network element considers the classification identifier of the non-3GPP network, and determines the second key based on the first key, the identifier of the non-3GPP network, and the classification identifier of the non-3GPP network. Therefore, different types of access manners in the non-3GPP network can be isolated.

Actions of the NG-RG, the UDM network element, the AUSF network element, or the AMF network element in step S501 to step S523 may be performed by the processor 401 in the communications device 400 shown in FIG. 4 by invoking the application program code stored in the memory 403. This is not limited in this embodiment.

Optionally, in the embodiment shown in FIG. 5A, FIG. 5B, and FIG. 5C, there is no necessary binding relationship between a solution for verifying validity of an access location of an NG-RG and a solution for isolating different types of access manners in a non-3GPP network. Specifically, the different types of the access manners in the non-3GPP network may be isolated by using the method for isolating the different types of the access manners in the non-3GPP network according to the embodiment of this application, and the validity of the access location of the NG-RG may be verified by using another method. Alternatively, the validity of the access location information of the NG-RG may be verified by using the method for verifying the validity of the access location of the NG-RG according to the embodiment of this application, and the different types of the access manners in the non-3GPP network are isolated by using another method. This is not specifically limited in the embodiment of this application.

In the embodiment shown in FIG. 5A, FIG. 5B, and FIG. 5C, an example in which the network device is a UDM network element is used for description. Optionally, in the embodiment of this application, the network device may alternatively be an AUSF network element. In this case, the UDM network element does not perform step S506 and step S507, adds first link information to the authentication vector obtaining response message in step S508, and optionally adds first virtual interface information. After obtaining subscription data of an NG-RG, the AUSF network element verifies validity of an access location of the NG-RG in a manner similar to step S506, or optionally, verifies validity of a current service of the NG-RG in a manner similar to step S507. For related descriptions, refer to the embodiment shown in FIG. 5A, FIG. 5B, and FIG. 5C. Details are not described herein again.

In the embodiment shown in FIG. 5A, FIG. 5B, and FIG. 5C, an example in which the network device is a UDM network element is used for description. Optionally, in the embodiment of this application, the network device may alternatively be an AMF network element. In this case, the UDM network element does not perform step S506 and step S507, adds first link information to the authentication vector obtaining response message in step S508, and optionally adds first virtual interface information. The AUSF network element further sends the authentication vector obtaining response message to the AMF network element by using step S508 or step S509. Further, after obtaining subscription data of an NG-RG, the AMF network element verifies validity of an access location of the NG-RG in a manner similar to step S506, or optionally, verifies validity of a current service of the NG-RG in a manner similar to step S507. For related descriptions, refer to the embodiment shown in FIG. 5A, FIG. 5B, and FIG. 5C. Details are not described herein again.

Figure 6A:
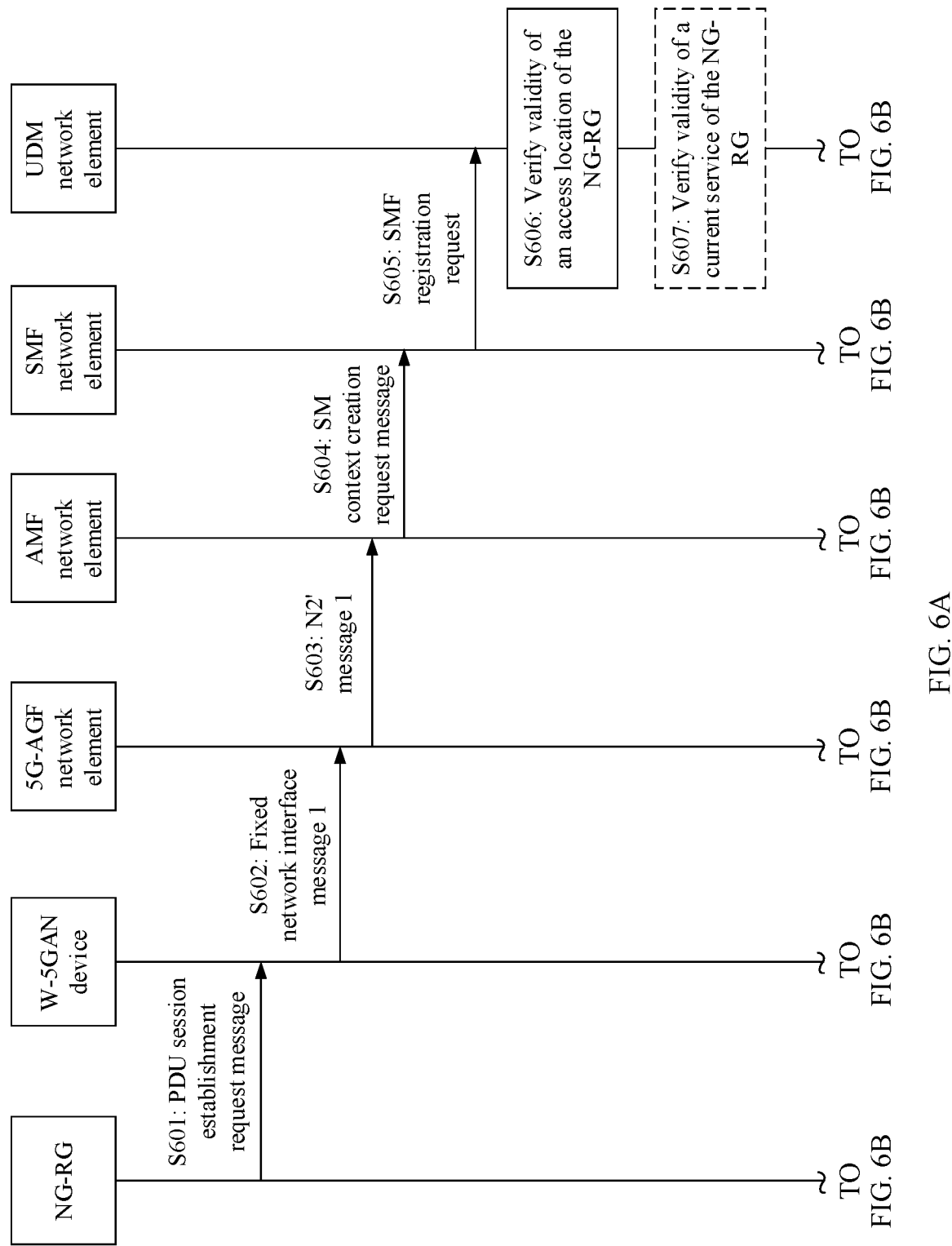
FIG. 6A, FIG. 6B, and FIG. 6C are a schematic flowchart 2 of an authentication method according to an embodiment of this application.
Figure 6B:
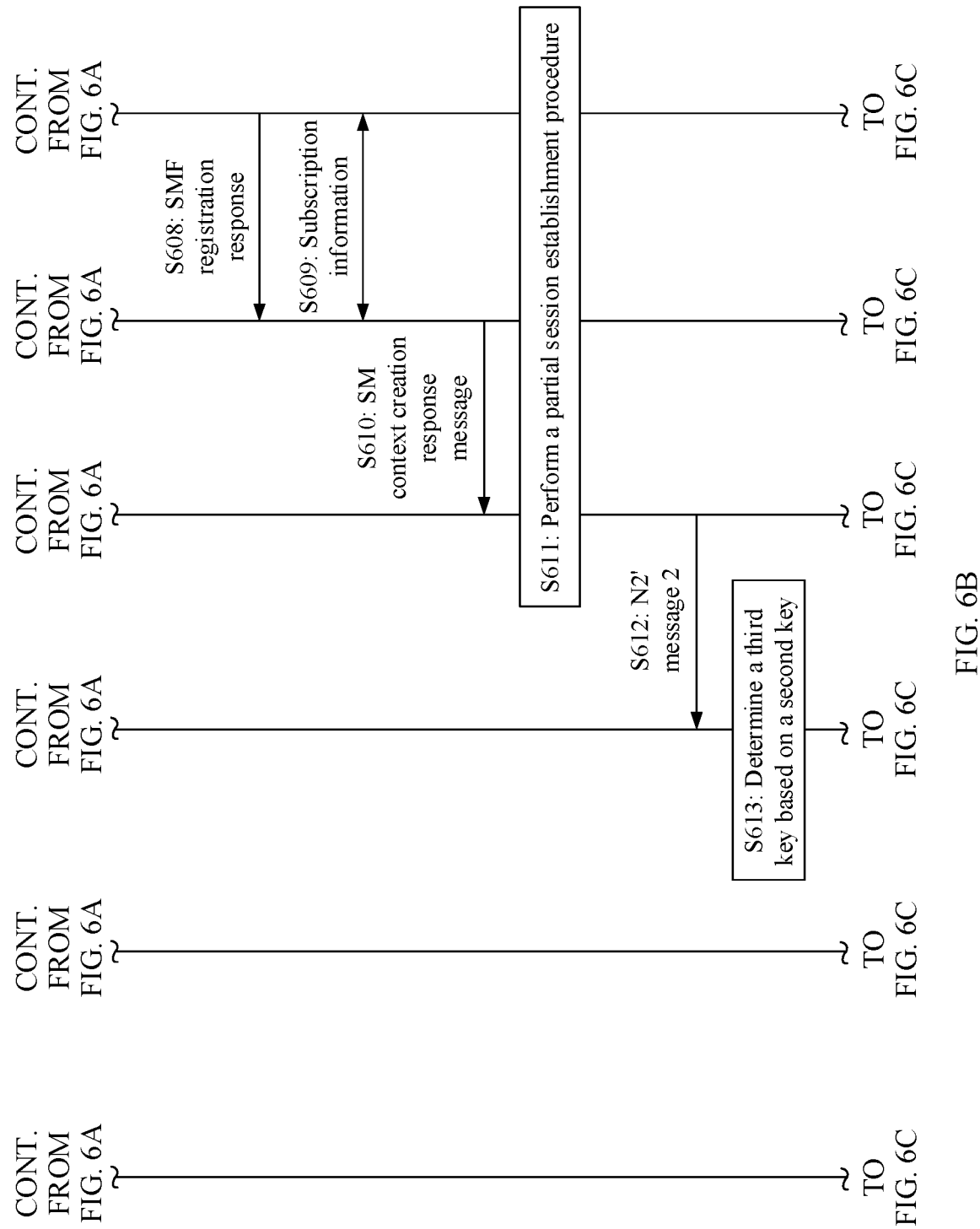
Figure 6C:
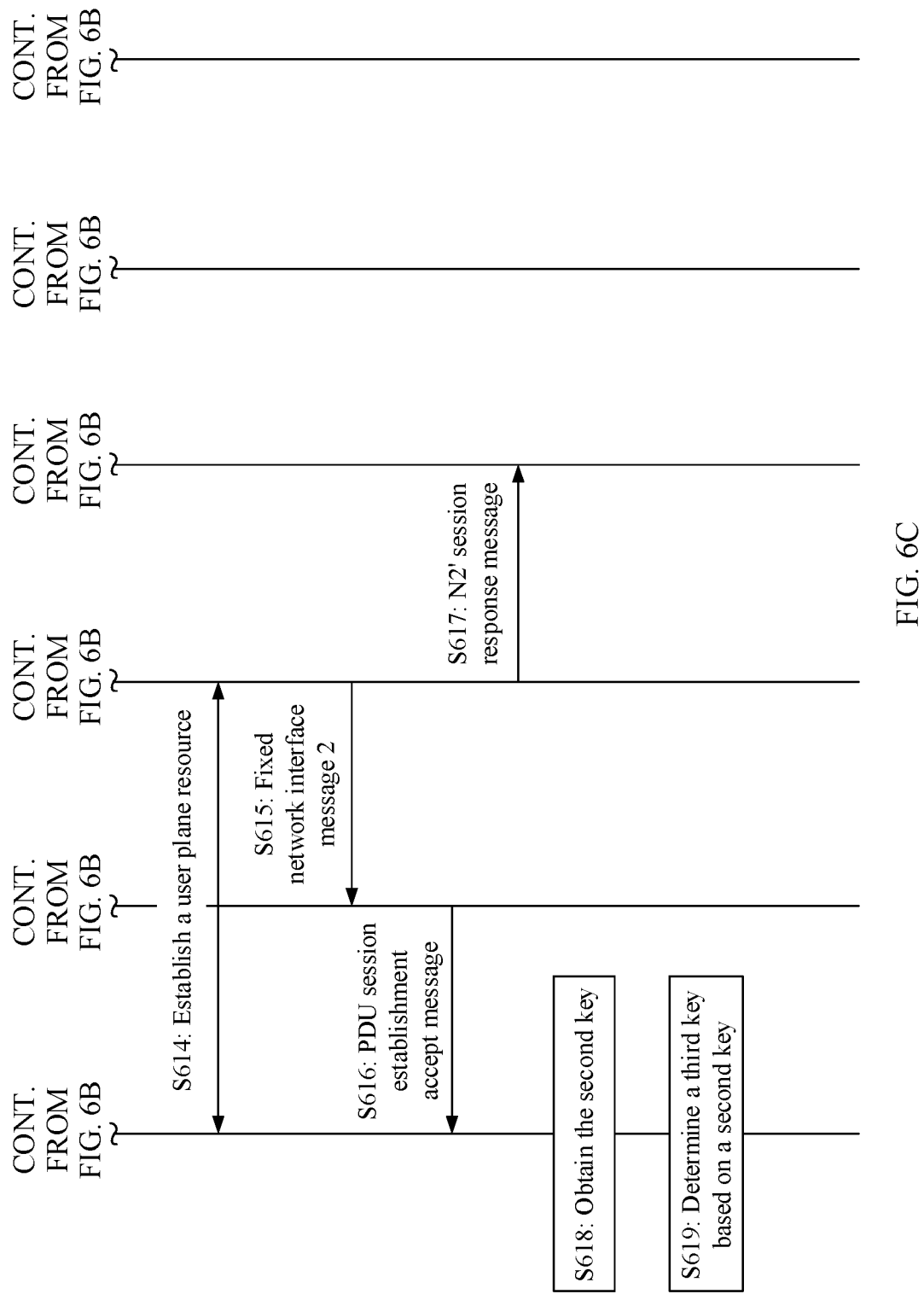

Optionally, an example in which the authentication system shown in FIG. 1 or FIG. 2 is applied to the fixed-mobile convergence network architecture shown in FIG. 3 and the network device is a UDM network element is used. FIG. 6A, FIG. 6B, and FIG. 6C show an authentication method according to an embodiment of this application. The authentication method includes the following steps.

S601: An NG-RG sends a PDU session establishment request message to a W-5GAN device.

Correspondingly, the W-5GAN device receives the PDU session establishment request message from the NG-RG.

Optionally, the PDU session establishment request message may include first virtual interface information. The first virtual interface information is used to represent a current service type of the NG-RG. For related descriptions of the first virtual interface information, refer to the foregoing authentication system part. Details are not described herein again.

S602: The W-5GAN device sends a fixed network interface message 1 to a 5G-AGF network element.

Correspondingly, the 5G-AGF network element receives the fixed network interface message 1 from the W-5GAN device.

The fixed network interface message 1 includes the PDU session establishment request message and newly added first link information, and the first link information is used to represent an access location of the NG-RG. For related descriptions of the first link information, refer to the foregoing authentication system part. Details are not described herein again.

S603: The 5G-AGF network element sends an NT message 1 to an AMF network element.

Correspondingly, the AMF network element receives the NT message 1 from the 5G-AGF network element. The NT message 1 includes the PDU session establishment request message and the first link information.

S604: The AMF network element sends a session management (SM) context creation request message to an SMF network element.

Correspondingly, the SMF network element receives the SM context creation request message from the AMF network element.

The SM context creation request message includes the first link information.

Optionally, if the PDU session establishment request message includes the first virtual interface information, the SM context creation request message may further include the first virtual interface information. This is not specifically limited in the embodiment of this application.

S605: The SMF network element sends an SMF registration request to a UDM network element.

Correspondingly, the UDM network element receives the SMF registration request from the SMF network element.

The SMF registration request includes the first link information.

Optionally, if the SM context creation request message includes the first virtual interface information, the SMF registration request may further include the first virtual interface information. This is not specifically limited in the embodiment of this application.

S606 and S607 are the same as step S506 and step S507 in the embodiment shown in FIG. 5A, FIG. 5B, and FIG. 5C. For related descriptions, refer to the embodiment shown in FIG. 5A, FIG. 5B, and FIG. 5C. Details are not described herein again.

Further, in the embodiment of this application, if the UDM network element verifies that the access location of the NG-RG is valid, the authentication method provided in the embodiment of this application may further include the following step.

S608: The UDM network element sends an SMF registration response to the SMF network element.

Correspondingly, the SMF network element receives the SMF registration response from the UDM network element.

S609: The SMF network element obtains subscription information of the NG-RG from the UDM network element. For related descriptions, refer to an existing implementation. Details are not described herein again.

S610: The SMF network element sends an SM context creation response message to the AMF network element.

Correspondingly, the AMF network element receives the SM context creation response message from the SMF network element.

S611: Perform a partial session establishment procedure located between step S610 and the following step S612. For related implementation, refer to an existing PDU session establishment procedure. Details are not described herein again.

S612: The AMF network element sends an N2' message 2 to the 5G-AGF network element.

Correspondingly, the 5G-AGF network element receives the NT message 2 from the AMF network element. The NT message 2 includes a PDU session establishment accept message.

Optionally, the NT message 2 in the embodiment of this application may be, for example, an N2' session request message. This is not specifically limited in the embodiment of this application.

S613: The 5G-AGF network element determines a third key based on the second key.

The second key in the embodiment of this application is a temporary key between the NG-RG and the 5G-AGF network element, and may be denoted as a Kagf. The third key in the embodiment of this application is a session temporary key between the NG-RG and the 5G-AGF network element, and may be denoted as a Kup-session.

The second key in the embodiment of this application may be derived in an existing derivation manner, or may be derived in a derivation manner in the embodiment shown in FIG. 5A, FIG. 5B, and FIG. 5C. This is not specifically limited in the embodiment of this application.

Optionally, in the embodiment of this application, that the 5G-AGF network element determines a third key based on the second key may include: The 5G-AGF network element determines the third key based on the second key and the first virtual interface information.

For example, the 5G-AGF network element determines the third key based on the second key and the first virtual interface information. For example, the third key may be determined according to the following third formula, and the third formula is:

Kup-session=KDF(Kagf, virtual interface information), where Kup-session represents a third key; Kagf represents a second key; and KDF is a key derivation function.

Alternatively, for example, the 5G-AGF network element determines the third key based on the second key and the first virtual interface information. For example, the third key may be determined according to the following fourth formula, and the fourth formula is:

Kup-session=KDF(Kagf, virtual interface information, confidentiality or integrity algorithm identifier), where Kup-session represents a third key; Kagf represents a second key; and KDF is a key derivation function.

Optionally, in the embodiment of this application, after obtaining the third key, the 5G-AGF network element may encrypt, by using the third key or a lower-layer key derived from the third key, session data to be sent to the NG-RG. This is not specifically limited in the embodiment of this application.

S614: Establish a user plane resource between the NG-RG network element and the 5G-AGF network element. For related implementations, refer to the prior art. Details are not described herein.

S615: The 5G-AGF network element sends a fixed network interface message 2 to the W-5GAN device.

Correspondingly, the W-5GAN device receives the fixed network interface message 2 from the 5G-AGF network element.

The fixed network interface message 2 includes the PDU session establishment accept message.

S616: The W-5GAN device sends a PDU session establishment accept message to the NG-RG.

Correspondingly, the NG-RG receives the PDU session establishment accept message from the W-5GAN device.

S617: The 5G-AGF network element sends an N2' message 3 to the AMF network element.

Correspondingly, the AMF network element receives the NT message 3 from the 5G-AGF network element.

Optionally, the NT message 3 in the embodiment of this application may be, for example, an N2' session response message. This is not specifically limited in the embodiment of this application.

S618: The NG-RG obtains the second key.

The second key in the embodiment of this application may be derived in an existing derivation manner, or may be derived in a derivation manner in the embodiment shown in FIG. 5A, FIG. 5B, and FIG. 5C. This is not specifically limited in the embodiment of this application.

S619: The NG-RG determines the third key based on the second key.

For a manner in which the NG-RG determines the third key based on the second key, refer to the manner in which the 5G-AGF network element determines the third key based on the second key in step S613. Details are not described herein again.

Optionally, in the embodiment of this application, after determining the third key, the NG-RG may encrypt, by using the third key or a lower-layer key derived from the third key, session data to be sent to the 5G-AGF network element. This is not specifically limited in the embodiment of this application.

Optionally, in step S606 in the embodiment of this application, if the UDM network element verifies that the access location of the NG-RG is invalid, or if the UDM network element verifies that the current service of the NG-RG is invalid, the UDM network element does not perform a subsequent session establishment procedure, sends a verification failure indication to the NG-RG, and optionally returns a verification failure cause, for example, link information or virtual interface information matching fails. This is not specifically limited in the embodiment of this application.

In one aspect, the UDM network element may obtain the first link information that represents the access location of the NG-RG and the second link information of the NG-RG, and may verify validity of the access location of the NG-RG based on the first link information and the second link information. Therefore, according to the authentication method provided in the embodiment of this application, the validity of the access location of the NG-RG can be verified in a fixed-mobile convergence architecture. In another aspect, because the UDM network element may obtain the first virtual interface information that represents the current service type of the NG-RG and the second virtual interface information of the NG-RG, and may verify validity of the current service of the NG-RG based on the first virtual interface information and the second virtual interface information. Therefore, according to the authentication method provided in the embodiment of this application, the validity of the current service of the NG-RG may be verified in the fixed-mobile convergence architecture. In still another aspect, in the embodiment of this application, when deriving the third key, the NG-RG or the 5G-AGF network element determines the third key based on the second key and the first virtual interface information. Therefore, different sessions in a non-3GPP network can be isolated.

Actions of the NG-RG, the UDM network element, the SMF network element, or the AMF network element in step S601 to step S619 may be performed by the processor 401 in the communications device 400 shown in FIG. 4 by invoking the application program code stored in the memory 403. This is not limited in this embodiment.

Optionally, in the embodiment shown in FIG. 6A, FIG. 6B, and FIG. 6C, there is no necessary binding relationship between a solution for verifying validity of an access location of an NG-RG and a solution for isolating different sessions in a non-3GPP network. Specifically, the different sessions in the non-3GPP network may be isolated by using the method for isolating the different sessions in the non-3GPP network according to the embodiment of this application, and the validity of the access location information of the NG-RG may be verified by using another method. Alternatively, the validity of the access location information of the NG-RG may be verified by using the method for verifying the validity of the access location information of the NG-RG according to the embodiment of this application, and the different sessions in the non-3GPP network are isolated by using another method. This is not specifically limited in the embodiment of this application.

In the embodiment shown in FIG. 6A, FIG. 6B, and FIG. 6C, an example in which the network device is a UDM network element is used for description. Optionally, in the embodiment of this application, the network device may alternatively be an SMF network element. In this case, the UDM network element does not perform step S606 and step S607, adds first link information to the SMF registration response in step S608, and optionally adds first virtual interface information. After obtaining subscription data of an NG-RG, the SMF network element verifies validity of an access location of the NG-RG in a manner similar to step S606, or optionally, verifies validity of a current service of the NG-RG in a manner similar to step S607. For related descriptions, refer to the embodiment shown in FIG. 6A, FIG. 6B, and FIG. 6C. Details are not described herein again.

In the embodiment shown in FIG. 6A, FIG. 6B, and FIG. 6C, an example in which the network device is a UDM network element is used for description. Optionally, in the embodiment of this application, the network device may alternatively be an AMF network element. In this case, the UDM network element does not perform step S606 and step S607, adds first link information to the SMF registration response in step S608, and optionally adds first virtual interface information. The SMF network element further sends the SM context creation response message to the AMF network element by using step S610 or step S611. Further, after obtaining subscription data of an NG-RG, the AMF network element verifies validity of an access location of the NG-RG in a manner similar to step S606, or optionally, verifies validity of a current service of the NG-RG in a manner similar to step S607. For related descriptions, refer to the embodiment shown in FIG. 6A, FIG. 6B, and FIG. 6C. Details are not described herein again.

Figure 7:
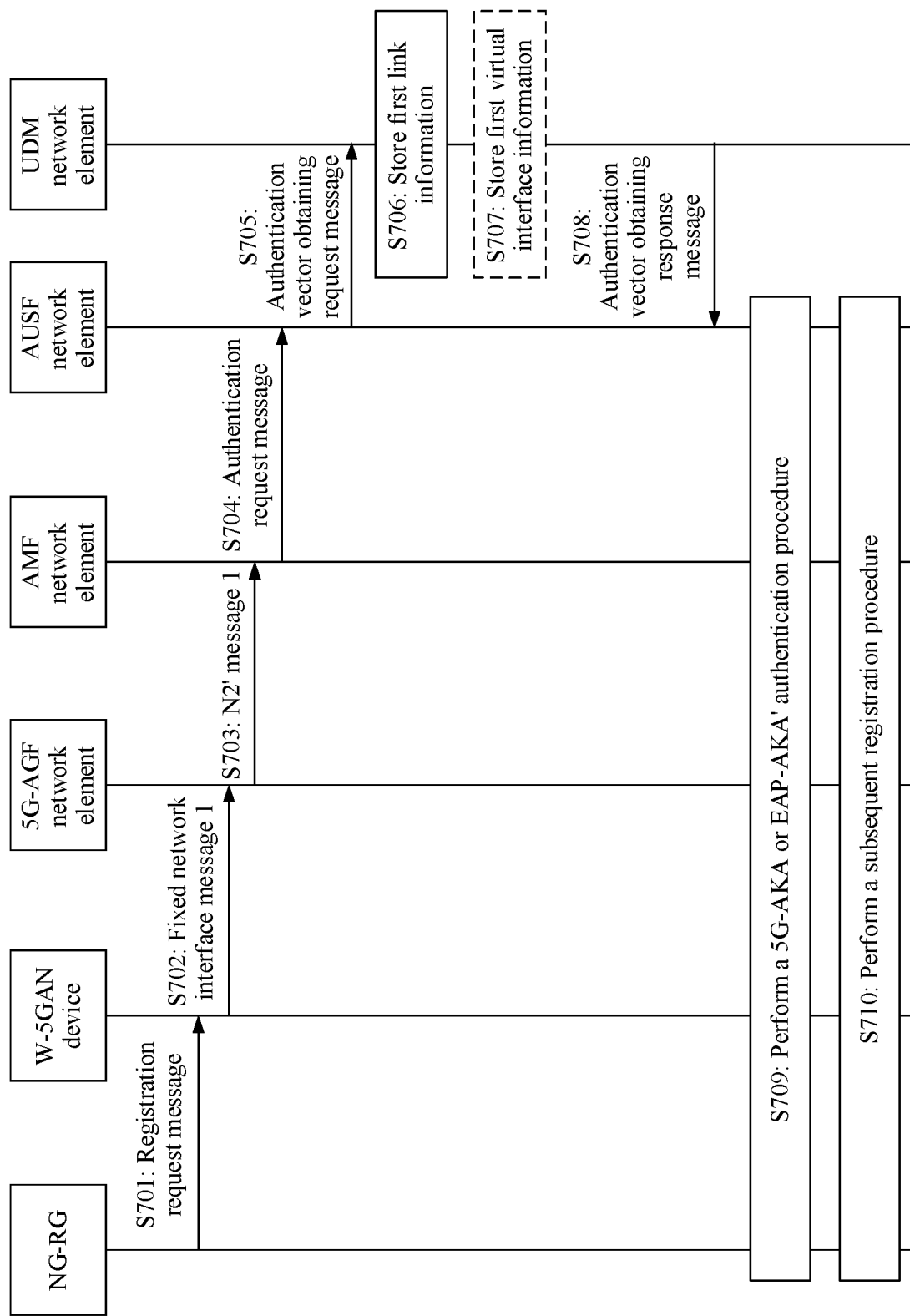
FIG. 7 is a schematic flowchart 3 of an authentication method according to an embodiment of this application.

Optionally, an example in which the authentication system shown in FIG. 1 or FIG. 2 is applied to the fixed-mobile convergence network architecture shown in FIG. 3 is used. FIG. 7 shows an authentication method according to an embodiment of this application. The authentication method includes the following steps.

Step S701 to step S705 are similar to step S501 to step S505 in the embodiment shown in FIG. 5A, FIG. 5B, and FIG. 5C. Differences lie in: for example, the first link information in step S501 to step S505 is replaced with the third link information in the embodiment of this application, the first virtual interface information in step S501 to step S505 is replaced with the third virtual interface information in the embodiment of this application. For other related descriptions, refer to the embodiment shown in FIG. 5A, FIG. 5B, and FIG. 5C. Details are not described herein again.

Optionally, the third link information in the embodiment of this application may be the same as or different from the first link information in the embodiment shown in FIG. 5A, FIG. 5B, and FIG. 5C. The third virtual interface information in the embodiment of this application may be the same as or different from the first virtual interface information in the embodiment shown in FIG. 5A, FIG. 5B, and FIG. 5C. This is not specifically limited in the embodiment of this application.

S706: The UDM network element stores the third link information into subscription information of the NG-RG according to a local policy.

For example, the local policy may be: for example, if a UDM network element does not store link information, the UDM network element automatically stores received link information; if a UDM network element already stores link information, the UDM network element automatically stores received link information after overwriting the link information; or, if a UDM network element already stores the link information, the UDM network element adds and stores received link information. This is not specifically limited in the embodiment of this application.

S707: Optionally, if the authentication vector obtaining request message in step S705 includes the third virtual interface information, the UDM network element stores the third virtual interface information in the subscription information of the NG-RG according to a local policy.

For example, the local policy may be: for example, if a UDM network element does not store virtual interface information, the UDM network element automatically stores received virtual interface information; if a UDM network element already stores virtual interface information, the UDM network element automatically stores received virtual interface information after overwriting the virtual interface information; or, if a UDM network element already stores the virtual interface information, the UDM network element adds and stores received virtual interface information. This is not specifically limited in the embodiment of this application.

S708: The UDM network element sends an authentication vector obtaining response message to the AUSF network element, so that the AUSF network element receives the authentication vector obtaining response message from the UDM network element.

In a possible implementation, when a service-oriented interface is used, the authentication vector obtaining response message may invoke, corresponding to the AUSF network element, a Nudm_UEauthentication_get response message of the UDM network element. This is not specifically limited in the embodiment of this application.

S709: Perform a 5G-AKA or EAP-AKA' authentication procedure. For details, refer to the descriptions of authentication procedures in section 6.1.3 in the 3GPP 33501. Details are not described herein again.

S710: For a subsequent registration procedure, refer to an existing registration procedure or a corresponding registration procedure part in FIG. 5A, FIG. 5B, and FIG. 5C. Details are not described herein again.

According to the authentication method provided in the embodiment of this application, in one aspect, an automatic link information binding manner can be provided, so that subscription of access location information of an NG-RG can be simplified; in another aspect, an automatic virtual interface information binding manner can be provided, so that subscription of a service type of an NG-RG can be simplified.

Actions of the NG-RG, the UDM network element, or the AMF network element in step S701 to step S710 may be performed by the processor 401 in the communications device 400 shown in FIG. 4 by invoking the application program code stored in the memory 403. This is not limited in this embodiment.

The foregoing mainly describes the solutions provided in the embodiments of this application from a perspective of interaction between network elements. It may be understood that, to implement the foregoing functions, the network device, the mobility management network element, the residential gateway, or the like include corresponding hardware structures and/or software modules for performing the functions. A person skilled in the art should be easily aware that the units and algorithm steps of each example described with reference to the embodiments disclosed in this specification may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiment of this application, function modules of the network device, the mobility management network element, or the residential gateway may be divided based on the foregoing method example. For example, function modules may be divided corresponding to functions, or two or more functions may be integrated into one processing module. The integrated module may be implemented in a form of hardware, or may be implemented in a form of a software function module. It should be noted that, in the embodiment of this application, module division is an example, and is merely logical function division. During actual implementation, another division manner may be used.

Figure 8:
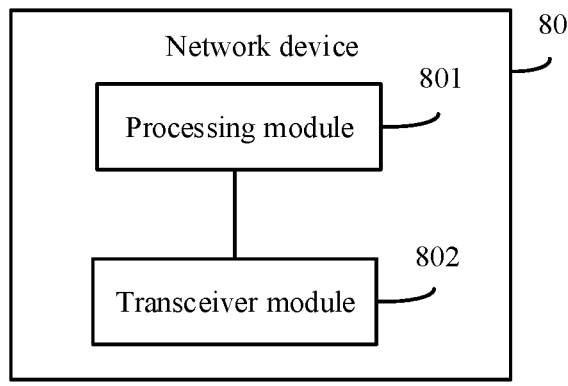
FIG. 8 is a schematic structural diagram of a network device according to an embodiment of this application.

For example, if function modules are obtained through division performed in an integrated manner, FIG. 8 is a schematic structural diagram of a network device 80. The network device 80 includes a transceiver module 802 and a processing module 801. The transceiver module 802 is configured to receive first link information. The first link information is used to represent an access location of a residential gateway. The processing module 801 is configured to obtain subscription information of the residential gateway. The subscription information of the residential gateway includes second link information of the residential gateway, and the second link information is used to represent a location of the residential gateway. The processing module 801 is further configured to verify validity of the access location of the residential gateway based on the first link information and the second link information.

Optionally, there are a plurality of pieces of second link information. That the processing module 801 is configured to verify validity of the access location of the residential gateway based on the first link information and the second link information includes: If the first link information matches any one of the plurality of pieces of second link information, the processing module 801 is configured to determine that the access location of the residential gateway is valid.

Optionally, the subscription information of the residential gateway further includes second virtual interface information of the residential gateway. The second virtual interface information is used to represent a service type of the residential gateway. The transceiver module 802 is further configured to receive first virtual interface information. The first virtual interface information is used to represent a current service type of the residential gateway. The processing module 801 is further configured to verify validity of a current service of the residential gateway based on the first virtual interface information and the second virtual interface information.

Optionally, there are a plurality of pieces of second virtual interface information. That the processing module 801 is configured to verify validity of a current service of the residential gateway based on the first virtual interface information and the second virtual interface information includes: If the first virtual interface information matches any one of the plurality of pieces of second virtual interface information, the processing module 801 is configured to determine that the current service of the residential gateway is valid.

Optionally, the network device 80 is a mobility management network element. The transceiver module 802 is further configured to send a NAS SMC request message to the residential gateway. The NAS SMC request message includes the first virtual interface information, and the first virtual interface information is used by the residential gateway to verify whether the first virtual interface information is modified on an air interface.

All related content of the steps in the foregoing method embodiments may be cited in function descriptions of the corresponding function modules. Details are not described herein again.

In this embodiment, the network device 80 is presented in a form of function modules obtained through division performed in an integrated manner. The "module" herein may be a specific ASIC, a circuit, a processor that executes one or more software or firmware programs, a memory, an integrated logic circuit, and/or another part that can provide the foregoing functions. In a simple embodiment, a person skilled in the art may figure out that the network device 80 may be in a form shown in FIG. 4.

For example, the processor 401 in FIG. 4 may invoke a computer-executable instruction stored in the memory 403, so that the network device 80 performs the authentication methods in the foregoing method embodiments.

Specifically, functions/implementation processes of the transceiver module 802 and the processing module 801 in FIG. 8 may be implemented by the processor 401 in FIG. 4 by invoking the computer-executable instruction stored in the memory 403. Alternatively, functions/implementation processes of the processing module 801 in FIG. 8 may be implemented by the processor 401 in FIG. 4 by invoking the computer-executable instruction stored in the memory 403, and functions/implementation processes of the transceiver module 802 in FIG. 8 may be implemented by the communications interface 404 in FIG. 4.

The network device 80 provided in this embodiment may perform the foregoing authentication methods. Therefore, for technical effects that can be obtained by the network device 80, refer to the foregoing method embodiments. Details are not described herein again.

Optionally, an embodiment of this application further provides an apparatus (for example, the apparatus may be a chip system). The apparatus includes a processor configured to support a network device to implement the foregoing authentication methods, for example, verifying validity of an access location of a residential gateway based on first link information and second link information. In a possible design, the apparatus further includes a memory. The memory is configured to store a program instruction and data that are required by the network device. Certainly, the memory may alternatively not be in the apparatus. When the apparatus is a chip system, the apparatus may include a chip, or may include a chip and another discrete device. This is not specifically limited in the embodiment of this application.

Figure 9:
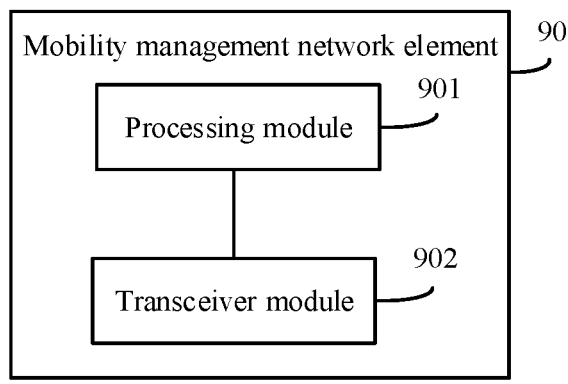
FIG. 9 is a schematic structural diagram of a mobility management network element according to an embodiment of this application.

Alternatively, for example, if function modules are obtained through division performed in an integrated manner, FIG. 9 is a schematic structural diagram of a mobility management network element 90. The mobility management network element 90 includes a processing module 901 and a transceiver module 902. The processing module 901 is configured to obtain a first key. The first key is a temporary key between the mobility management network element 90 and a residential gateway. The processing module 901 is further configured to determine a second key based on the first key, an identifier of a non-3GPP network, and a classification identifier of the non-3GPP network. The transceiver module 902 is further configured to send the second key to an access gateway function network element.

Specifically, the processing module 901 is configured to determine the second key based on the first key, the identifier of the non-3GPP network, the classification identifier of the non-3GPP network, and a non-access stratum NAS message count value.

Optionally, the classification identifier of the non-3GPP network is used to indicate that an access manner of the residential gateway is fixed network access or Wi-Fi access.

Optionally, the NAS message count value is an uplink NAS message count value or a downlink NAS message count value.

All related content of the steps in the foregoing method embodiments may be cited in function descriptions of the corresponding function modules. Details are not described herein again.

In this embodiment, the mobility management network element 90 is presented in a form of function modules obtained through division performed in an integrated manner. The "module" herein may be a specific ASIC, a circuit, a processor that executes one or more software or firmware programs, a memory, an integrated logic circuit, and/or another part that can provide the foregoing functions. In a simple embodiment, a person skilled in the art may figure out that the mobility management network element 90 may be in a form shown in FIG. 4.

For example, the processor 401 in FIG. 4 may invoke a computer-executable instruction stored in the memory 403, so that the mobility management network element 90 performs the authentication methods in the foregoing method embodiments.

Specifically, functions/implementation processes of the transceiver module 902 and the processing module 901 in FIG. 9 may be implemented by the processor 401 in FIG. 4 by invoking the computer-executable instruction stored in the memory 403. Alternatively, functions/implementation processes of the processing module 901 in FIG. 9 may be implemented by the processor 401 in FIG. 4 by invoking the computer-executable instruction stored in the memory 403, and functions/implementation processes of the transceiver module 902 in FIG. 9 may be implemented by the communications interface 404 in FIG. 4.

The mobility management network element 90 provided in this embodiment may perform the foregoing authentication methods. Therefore, for technical effects that can be obtained by the mobility management network element 90, refer to the foregoing method embodiments. Details are not described herein again.

Optionally, an embodiment of this application further provides an apparatus (for example, the apparatus may be a chip system). The apparatus includes a processor configured to support a mobility management network element to implement the foregoing authentication methods, for example, determining a second key based on a first key, an identifier of a non-3GPP network, a classification identifier of the non-3GPP network. In a possible design, the apparatus further includes a memory. The memory is configured to store a program instruction and data that are required by the mobility management network element. Certainly, the memory may alternatively not be in the apparatus. When the apparatus is a chip system, the apparatus may include a chip, or may include a chip and another discrete device. This is not specifically limited in the embodiment of this application.

Figure 10:
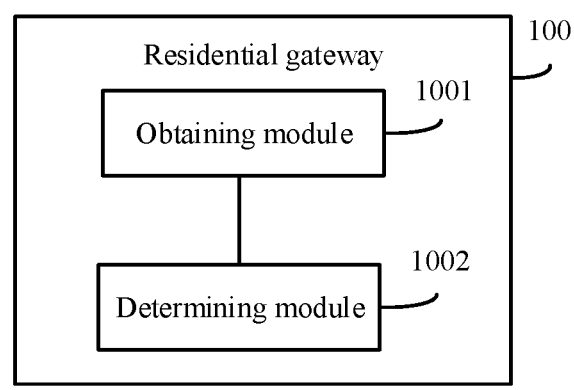
FIG. 10 is a schematic structural diagram of a residential gateway according to an embodiment of this application.

Alternatively, for example, if function modules are obtained through division performed in an integrated manner, FIG. 10 is a schematic structural diagram of a residential gateway 100. The residential gateway 100 includes an obtaining module 1001 and a determining module 1002. The obtaining module 1001 is configured to obtain a first key. The first key is a temporary key between the residential gateway and a mobility management network element. The determining module 1002 is configured to determine a second key based on the first key, an identifier of a non-3GPP network, and a classification identifier of the non-3GPP network.

Optionally, that the determining module 1002 is configured to determine a second key based on the first key, an identifier of a non-3GPP network, and a classification identifier of the non-3GPP network includes: The determining module 1002 is configured to determine the second key based on the first key, the identifier of the non-3GPP network, the classification identifier of the non-3GPP network, and a non-access stratum NAS message count value.

Optionally, the classification identifier of the non-3GPP network is used to indicate that an access manner of the residential gateway is fixed network access or Wi-Fi access.

Optionally, the NAS message count value is an uplink NAS message count value or a downlink NAS message count value.

All related content of the steps in the foregoing method embodiments may be cited in function descriptions of the corresponding function modules. Details are not described herein again.

In this embodiment, the residential gateway 100 is presented in a form of function modules obtained through division performed in an integrated manner. The "module" herein may be a specific ASIC, a circuit, a processor that executes one or more software or firmware programs, a memory, an integrated logic circuit, and/or another part that can provide the foregoing functions. In a simple embodiment, a person skilled in the art may figure out that the residential gateway 100 may be in a form shown in FIG. 4.

For example, the processor 401 in FIG. 4 may invoke a computer-executable instruction stored in the memory 403, so that the residential gateway 100 performs the authentication methods in the foregoing method embodiments.

Specifically, functions/implementation processes of the obtaining module 1001 and the determining module 1002 in FIG. 10 may be implemented by the processor 401 in FIG. 4 by invoking the computer-executable instruction stored in the memory 403.

The residential gateway 100 provided in this embodiment may perform the foregoing authentication methods. Therefore, for technical effects that can be obtained by the residential gateway 100, refer to the foregoing method embodiments. Details are not described herein again.

Optionally, an embodiment of this application further provides an apparatus (for example, the apparatus may be a chip system). The apparatus includes a processor configured to support a residential gateway to implement the foregoing authentication methods, for example, determining a second key based on a first key, an identifier of a non-3GPP network, a classification identifier of the non-3GPP network. In a possible design, the apparatus further includes a memory. The memory is configured to store a program instruction and data that are required by the residential gateway. Certainly, the memory may alternatively not be in the apparatus. When the apparatus is a chip system, the apparatus may include a chip, or may include a chip and another discrete device. This is not specifically limited in the embodiment of this application.

All or some of the foregoing embodiments may be implemented by using software, hardware, firmware, or any combination thereof. When a software program is used to implement the embodiments, the embodiments may be implemented all or partially in a form of a computer program product. The computer program product includes one or more computer instructions. When the computer program instructions are loaded and executed on a computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprise" (comprising) does not exclude another component or another step, and "a" or "one" does not exclude a case of a plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application. Obviously, a person skilled in the art can make various modifications and variations to this application without departing from the spirit and scope of this application. This application is intended to cover these modifications and variations of this application provided that they fall within the protection scope defined by the following claims and their equivalent technologies.

What is claimed is:

1. An authentication method, wherein the method comprises:
   receiving, by a mobility management network device, first link information, wherein the first link information is used to represent an access location of a residential gateway;
   obtaining, by the mobility management network device, subscription information of the residential gateway, wherein the subscription information of the residential gateway comprises second link information of the residential gateway and second virtual interface information of the residential gateway, the second link information is used to represent a location of the residential gateway, and the second virtual interface information is used to represent a service type of the residential gateway; and
   verifying, by the mobility management network device, validity of the access location of the residential gateway based on the first link information and the second link information;
   receiving, by the mobility management network device, first virtual interface information, wherein the first virtual interface information is used to represent a current service type of the residential gateway; and
   verifying, by the mobility management network device, validity of a current service of the residential gateway based on the first virtual interface information and the second virtual interface information; and
   sending, by the mobility management network device, a non-access stratum security mode command (NAS SMC) request message to the residential gateway, wherein the NAS SMC request message comprises the first virtual interface information, and the first virtual interface information is used by the residential gateway to verify whether the first virtual interface information is modified on an air interface.

2. The method according to claim 1, wherein there are a plurality of pieces of second link information; and
   the verifying, by the mobility management network device, validity of the access location of the residential gateway based on the first link information and the second link information comprises:
   if the first link information matches any one of the plurality of pieces of second link information, determining, by the mobility management network device, that the access location of the residential gateway is valid.

3. The method according to claim 1, wherein there are a plurality of pieces of second virtual interface information; and
   the verifying, by the mobility management network device, validity of a current service of the residential gateway based on the first virtual interface information and the second virtual interface information comprises:
   if the first virtual interface information matches any one of the plurality of pieces of second virtual interface information, determining, by the mobility management network device, that the current service of the residential gateway is valid.

4. A mobility management network device, wherein the mobility management network device comprises at least one processor configured to execute instructions stored in a memory, wherein the instructions instruct the at least one processor to:
   receive first link information, wherein the first link information is used to represent an access location of a residential gateway;
   obtain subscription information of the residential gateway, wherein the subscription information of the residential gateway comprises second link information of the residential gateway and second virtual interface information of the residential gateway, the second link information is used to represent a location of the residential gateway, and the second virtual interface information is used to represent a service type of the residential gateway;
   verify validity of the access location of the residential gateway based on the first link information and the second link information; and
   receive first virtual interface information, wherein the first virtual interface information is used to represent a current service type of the residential gateway;
   verify validity of a current service of the residential gateway based on the first virtual interface information and the second virtual interface information; and
   send a non-access stratum security mode command (NAS SMC) request message to the residential gateway, wherein the NAS SMC request message comprises the first virtual interface information, and the first virtual interface information is used by the residential gateway to verify whether the first virtual interface information is modified on an air interface.

5. The mobility management network device according to claim 4, wherein there are a plurality of pieces of second link information; and
    the instructions instruct the at least one processor to verify validity of the access location of the residential gateway based on the first link information and the second link information comprises:
        if the first link information matches any one of the plurality of pieces of second link information, determine that the access location of the residential gateway is valid.

6. The mobility management network device according to claim 4, wherein there are a plurality of pieces of second virtual interface information; and
    the instructions instruct the at least one processor to verify validity of the current service of the residential gateway based on the first virtual interface information and the second virtual interface information comprises:
        if the first virtual interface information matches any one of the plurality of pieces of second virtual interface information, determine that the current service of the residential gateway is valid.

\* \* \* \* \*